(12) United States Patent
Heavner

(10) Patent No.: US 11,035,783 B2
(45) Date of Patent: Jun. 15, 2021

(54) NORMALIZING THE RESPONSE OF A FLUORESCENCE INSTRUMENT USING SPECTRAL RESPONSE

(71) Applicant: ORTHO-CLINICAL DIAGNOSTICS, INC., Raritan, NJ (US)

(72) Inventor: David A. Heavner, Fairport, NY (US)

(73) Assignee: ORTHO-CLINICAL DIAGNOSTICS, INC., Raritan, NJ (US)

( * ) Notice: Subject to any disclaimer, the term of this patent is extended or adjusted under 35 U.S.C. 154(b) by 315 days.

(21) Appl. No.: 15/889,765

(22) Filed: Feb. 6, 2018

(65) Prior Publication Data
US 2018/0231458 A1   Aug. 16, 2018

Related U.S. Application Data

(63) Continuation of application No. 15/512,343, filed as application No. PCT/US2015/050576 on Sep. 17, 2015, now abandoned.
(Continued)

(51) Int. Cl.
*G01N 21/27* (2006.01)
*G01N 21/64* (2006.01)
(Continued)

(52) U.S. Cl.
CPC .......... *G01N 21/274* (2013.01); *G01J 3/4406* (2013.01); *G01N 21/645* (2013.01);
(Continued)

(58) Field of Classification Search
CPC ............. G01N 21/274; G01N 21/6428; G01N 21/645; G01N 35/00693; G01J 3/4406
See application file for complete search history.

(56) References Cited

U.S. PATENT DOCUMENTS 8,760,645 B2   6/2014  Misener et al.
2008/0297796 A1  12/2008  Lukas et al.

FOREIGN PATENT DOCUMENTS

WO   WO 2016/044523 A1   3/2016

OTHER PUBLICATIONS

Resch-Genger et al. How to improve quality assurance in fluorometry: fluorescence-inherent sources of error and suited fluorescence standards, Journal of Fluorescence vol. 15, No. 3, pp. 337-362 (Year: 2005).*

(Continued)

*Primary Examiner* — David P Porta
*Assistant Examiner* — Shun Lee
(74) *Attorney, Agent, or Firm* — K&L Gates LLP; Louis C. Cullman; Dennis A. Majewski

(57) ABSTRACT

A method to normalize at least one of a population of subordinate clinical diagnostic analyzer to a master clinical diagnostic analyzer such that an assay result from a subordinate clinical diagnostic analyzer can be converted to the equivalent result of the master clinical diagnostic analyzer by using a simple multiplicative factor when the assay executed on each analyzer uses a common fluorescently labeled dye. Also a method to re-normalize a subordinate clinical diagnostic analyzer assay result to a master clinical diagnostic analyzer assay result by using a simple multiplicative factor when the assay executed on the subordinate clinical diagnostic analyzer uses a different fluorescently labeled dye than the assay executed on the master clinical diagnostic analyzer.

15 Claims, 9 Drawing Sheets

Fluorescence Optical Detection System Schematic

Related U.S. Application Data

(60) Provisional application No. 62/052,132, filed on Sep. 18, 2014.

(51) Int. Cl.
 *G01J 3/44* (2006.01)
 *G01N 35/00* (2006.01)

(52) U.S. Cl.
 CPC ... *G01N 21/6428* (2013.01); *G01N 35/00693* (2013.01); *G01N 2021/6439* (2013.01); *G01N 2201/12746* (2013.01)

(56) References Cited

OTHER PUBLICATIONS

Russian Office Action and Search Report for RU 2017112093; dated Dec. 19, 2017; 19 pgs.
Calibrating Fluorometers for Clinical Diagnostics; Design and Quality for Biomedical Technologies II; Heinz E. et al.; ©2009; V.7170; 7 pgs; http://sci-hub.tw.10.1117/12.810351.
Characterization of Standard Reference Material 2943, Cu-ion-doped glass, Spectral Correction Standard for Blue Fluorescence; Journal of Luminescence; Derose P.C. et al.; © 2011; V.131; 6 pgs; http://www.sciencedirect.com/science/article/pii/S0022231311003942.
International Search Report and Written Opinion for PCT/US2015/050576; dated Dec. 8, 2015: 5 pages.
Office Action issued in related European Patent Application No. 15841304.7 dated Apr. 13, 2018.

\* cited by examiner

Fig. 1 – Labeled Antibody Binding

Fig. 2 – Fluorescence Optical Detection System Schematic

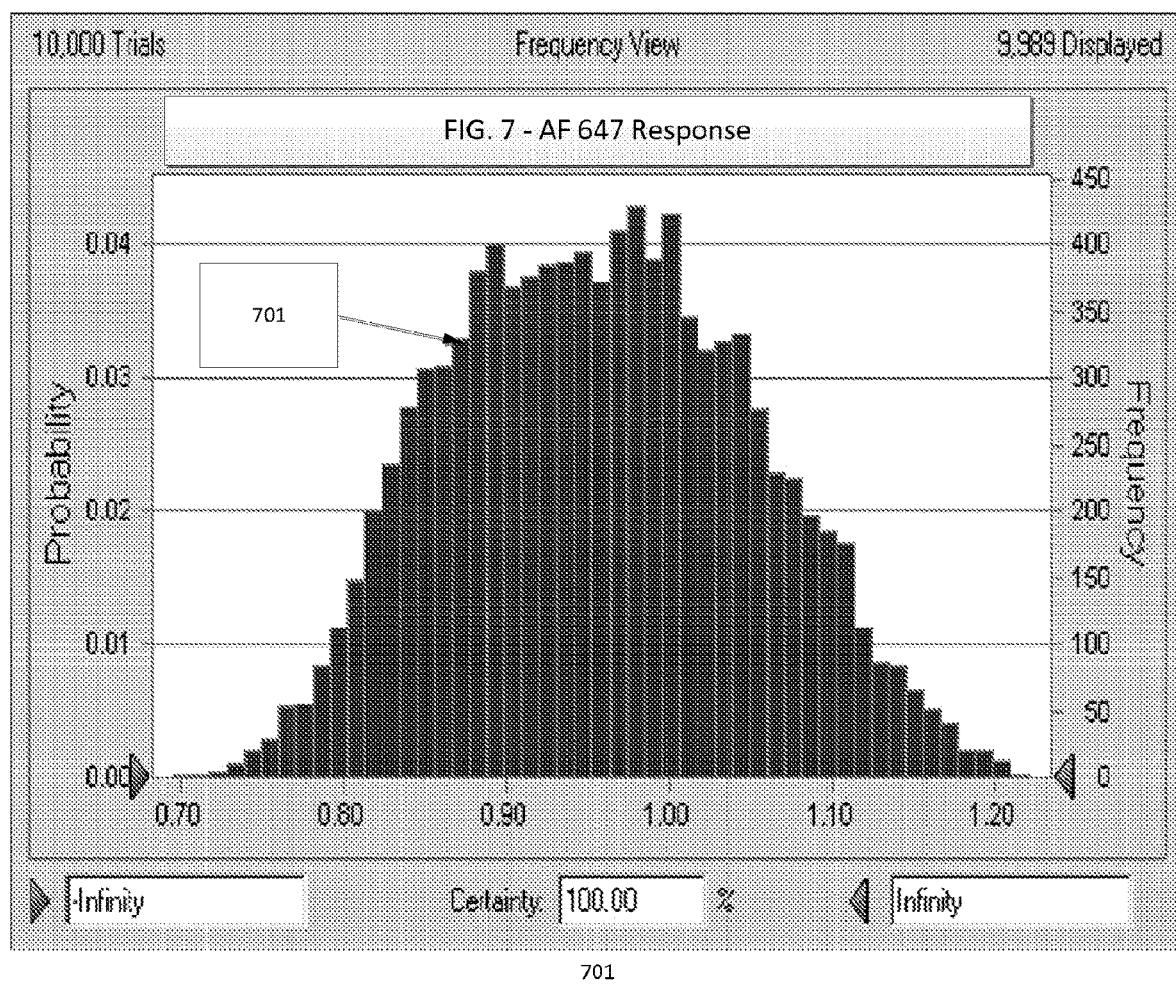

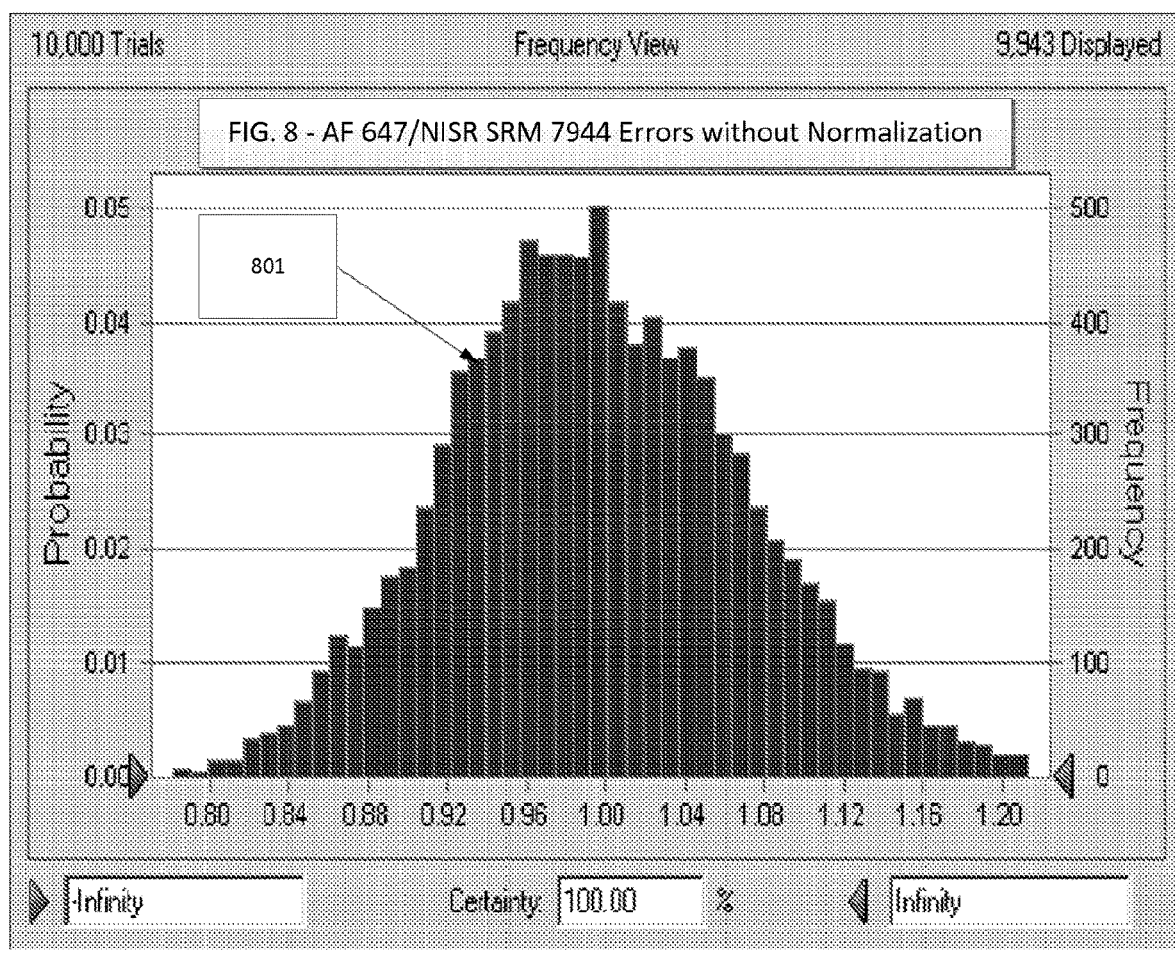

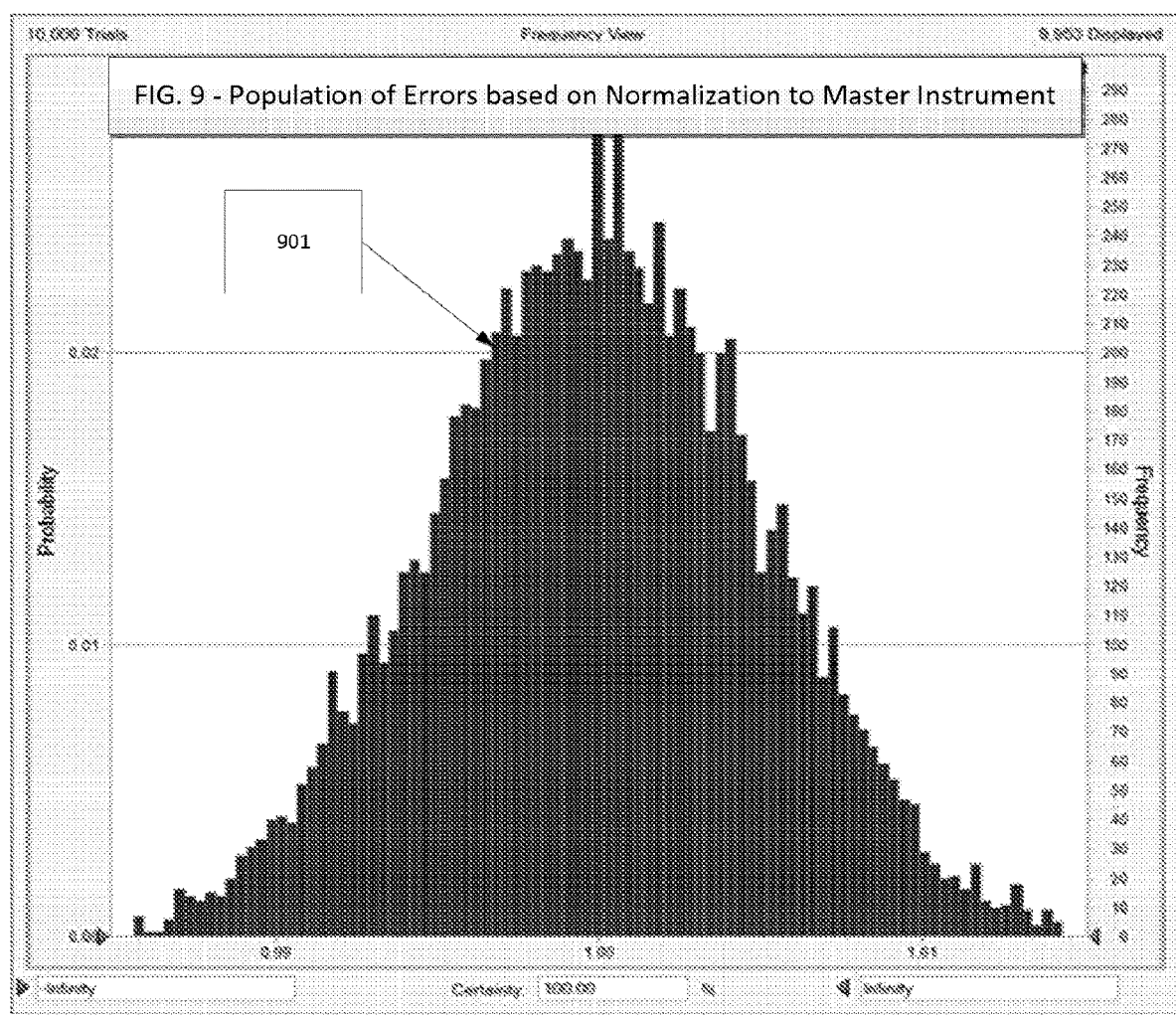

NORMALIZING THE RESPONSE OF A FLUORESCENCE INSTRUMENT USING SPECTRAL RESPONSE

CROSS REFERENCE TO RELATED APPLICATION(S)

This application is a continuation of U.S. patent application Ser. No. 15/512,343, filed Mar. 17, 2017, which is a national stage application under 35 U.S.C. § 371 of International Application No. PCT/US2015/050576, filed Sep. 17, 2015, which claims priority under applicable portions of 35 U.S.C. § 119 of U.S. Patent Application Ser. No. 62/052,132, filed Sep. 18, 2014, the entire contents of each application being incorporated herein by reference.

FIELD OF THE INVENTION

The invention relates generally to a method of calibrating diagnostic analyzers using fluorometry as a measurement mechanism.

BACKGROUND OF THE INVENTION

The present invention pertains to at least one clinical diagnostic analyzer conducting an immunoassay employing a fluorescence label. Typically, a fluorescence label is bound to antibodies or antigens having an affinity for the analyte of interest. The unknown analyte in the sample then binds with the labeled antibodies or antigens which are usually immobilized to a substrate. The unbound, labeled antibodies or antigens are subsequently washed away, and the concentration of bound, labeled antibodies or antigens is measured using fluorometry.

Fluorometry is the measurement of fluorescence. Fluorescence is the molecular adsorption of light energy at one wavelength and its nearly instantaneous re-emission at another, usually longer, wavelength. The instrument used to measure fluorescence is called a fluorometer. A fluorometer generates the wavelength of light required to excite the analyte of interest and then it measures the intensity of the resulting emitted light. The amount or quantity of emitted light is frequently proportional to the concentration of the analyte being measured. When employed in clinical diagnostic analyzers fluorometry provides extraordinary sensitivity, high specificity, simplicity, and low cost as compared to other analytical techniques.

To insure the quality control of results from fluorometers, some form of stable reference standard is employed such as National Institute of Standards and Technology (NIST) SRM (Standard Reference Material) 2944 glass. SRM 2944 is a cuvette-shaped, bismuth-ion-doped glass, recommended for use for relative spectral correction of emission and day-to-day performance verification of steady-state fluorescence spectrometers. Further information regarding SRM 2944 is described by Paul C. DeRose; Melody V. Smith; Jeffrey R. Anderson; Gary W. Kramer in the Journal of Luminescence, Volume 141, pp. 9-14, entitled "Characterization of Standard Reference Material 2944, Bi-Ion-Doped Glass, Spectral Correction Standard for Red Fluorescence" which is hereby incorporated by reference in its entirety.

One problem presented by fluorometers is that variations in the manufacture of clinical diagnostic analyzers are such that for a given fluorescence label; the population of clinical diagnostic analyzers will not provide the same analytical result for a specific quantity of analyte in a sample. These manufacturing variations result from differences in excitation light spectra from the laser diode, variances in transmission characteristics of optical filters, etc. Hence, to account for these variations and to provide accurate results each individual clinical diagnostic analyzer must be calibrated.

Another problem presented by fluorometers is that the introduction of a new fluorescence label having differing absorption and emission spectra will require a total re-calibration of the entire clinical diagnostic analyzer population.

SUMMARY OF THE INVENTION

One object of the present invention is to enable a population of clinical diagnostic analyzers or instruments to be normalized to a specific master clinical diagnostic analyzer or instrument such that the response of any subordinate clinical diagnostic analyzer or instrument in the population to a sample having a specific amount of analyte is substantially the same as the response of the master clinical diagnostic analyzer or instrument to that sample after an initial factory calibration.

Another object of the present invention is allow the introduction of a new fluorescence label having a different adsorption and emission spectrum as compared to a prior fluorescence label such that the re-calibration and re-normalization of the entire population of clinical diagnostic analyzers to the master clinical diagnostic analyzer depends only upon the absorption and emission spectra of the new fluorescence label. Total re-calibration of the population of clinical diagnostic analyzers is not required.

The foregoing and further objects of the invention are accomplished according to one aspect of the invention that provides a method of normalizing a first diagnostic result of a subordinate clinical diagnostic analyzer to a second diagnostic result of a master clinical diagnostic analyzer comprising the steps of obtaining a normalized excitation intensity spectrum of the master clinical diagnostic analyzer, obtaining a normalized excitation intensity spectrum of the subordinate clinical diagnostic analyzer, obtaining a normalized responsivity intensity spectrum of the master clinical diagnostic analyzer, obtaining a normalized responsivity intensity spectrum of the subordinate clinical diagnostic analyzer, obtaining a normalized excitation/emission spectrum of a solid inorganic photostable fluorophore calibration target, reading the solid inorganic photostable fluorophore calibration target in the master clinical diagnostic analyzer thereby obtaining a first response value, reading the solid inorganic photostable fluorophore calibration target in the subordinate clinical diagnostic analyzer thereby obtaining a second response value, determining the gain ratio of the master clinical diagnostic analyzer to the subordinate clinical diagnostic analyzer based upon the two above obtained response values, determining a multiplicative normalization factor between a normalized subordinate clinical diagnostic analyzer and the master clinical diagnostic analyzer, determining the relative adsorption/emission spectrum of a first fluorescently labeled dye whereas the first fluorescently labeled dye is a diagnostic assay component, obtaining a first diagnostic result from a specific patient specimen or sample incorporating the first fluorescently labeled dye using the normalized subordinate clinical diagnostic analyzer, and multiplying the first diagnostic result by the multiplicative normalization factor to obtain a second diagnostic result whereas the second diagnostic result is a normalized approximation to a diagnostic result which would be obtained by analyzing the specific patient specimen or sample on the master clinical diagnostic analyzer.

Still another aspect of the invention provides a method to re-normalize a subordinate clinical diagnostic analyzer assay result as compared to a master clinical diagnostic analyzer assay result comprising the steps of normalizing the subordinate clinical diagnostic analyzer as above, obtaining a relative adsorption/intensity spectrum of a second fluorescently labeled dye whereas the second fluorescently labeled dye is a diagnostic assay component, determining a re-normalization multiplicative factor between a subordinate clinical diagnostic analyzer and a master clinical diagnostic analyzer, obtaining a first diagnostic result from a specific patient specimen or sample incorporating the second fluorescently labeled dye using the normalized subordinate clinical diagnostic analyzer, and multiplying the first diagnostic result by the re-normalization factor to obtain a second diagnostic result whereas the second diagnostic result is a normalized approximation to a diagnostic result which would be obtained by analyzing the specific patient specimen or sample on the master clinical diagnostic analyzer.

Further objects, features and advantages of the present invention will be apparent to those skilled in the art from detailed consideration of the preferred embodiments that follow.

BRIEF DESCRIPTION OF THE DRAWINGS

FIG. 7 is a histogram of the responses to a set of fixed analyte concentration samples or specimens using Alexa Fluor® 647 when subjected to instrument variations.

FIG. 8 is a histogram of the ratio of responses to a set of fixed analyte concentration samples or specimens comparing bismuth-doped phosphor glass and Alexa Fluor® 647 when subjected to instrument variations.

FIG. 9 is a histogram of the ratio of responses to a set of fixed analyte concentration samples or specimens comparing bismuth-doped phosphor glass and Alexa Fluor® 647 when subjected to instrument variations when corrected using instrument normalization.

DETAILED DESCRIPTION OF PREFERRED EMBODIMENTS

Figure 1:
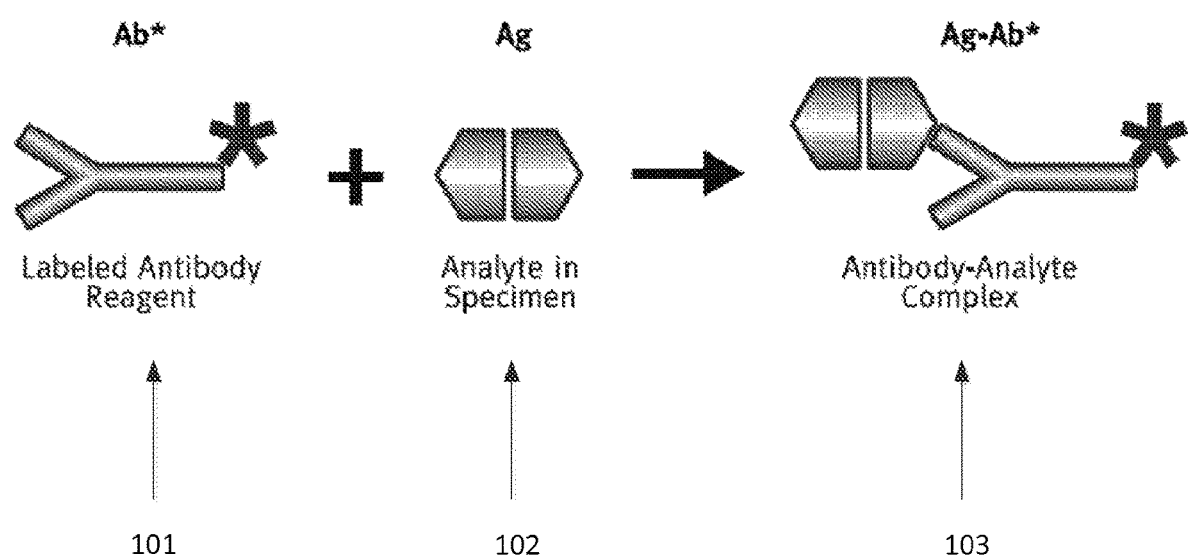
FIG. 1 is a view of the chemistry associated with an immunoassay usually contained in an analytic slide (not shown).

While the present invention is described with respect to preferred embodiments as detailed below and shown in the figures, the present invention is limited only by the metes and bounds of the claims that follow.

Fluorometry is chosen for its extraordinary sensitivity, high specificity, simplicity, and low cost as compared to other analytical techniques. Fluorometry is ordinarily 1000-fold more sensitive than absorbance measurements. It is a widely accepted and powerful technique that is used for a variety of environmental, industrial, and biotechnology applications. It is a valuable analytical tool for both quantitative and qualitative analysis. However, fluorometry requires a stable fluorescence standard to insure that the clinical diagnostic analyzers remain normalized and in calibration. Organic fluorophores, especially those in liquid form, are not well suited for use in normalizing analyzers in a factory setting because they photobleach, have limited shelf life, are prone to carryover problems, and are difficult to dose. A solid inorganic photostable fluorophore would not have the above problems, but there are only a limited number of these materials available.

In conjunction with a preferred embodiment of the present inventive method, a device has been designed using a National Institute of Standards and Technology (NIST) developed material consisting of a phosphate matrix glass doped with bismuth ion such that the glass has fluorescent properties. This material is known as NIST Standard Reference Material (SRM) 2944 glass. The composition of such material is shown in Table A.

TABLE A

| Composition of NIST SRM 2944 Glass | | |
|---|---|---|
| Ingredient | Weight % | Mole % |
| $P_2O_5$ | 70.52 | 49.84 |
| CaO | 26.20 | 47.05 |
| $Al_2O_3$ | 3.04 | 3.00 |
| $Bi_2O_3$ | 0.51 | 0.11 |

This device has been designed to overcome the limitations listed above and is used in connection with this inventive method; see copending United States patent application by Freeman III, Heavner, and Oenick entitled "Fluorescence Reference Standard Device" (Application No. PCT/US15/50608) which is hereby incorporated by reference in its entirety. For different wavelength fluorometry a different material other than NIST SRM 2944 would be used, such as other phosphate doped glasses also available from NIST, including SRM 2943, copper doped glass, spectral correction standard for blue fluorescence.

The above described NIST SRM 2944 glass device is a preferred solid inorganic photostable fluorophore used in the inventive method described herein to normalize a population of subordinate clinical diagnostic analyzers to a master clinical diagnostic analyzer. Using the excitation and emission spectrums of the NIST SRM 2944 glass, the excitation and emission spectrums of the fluorescence label employed in the combination fluorescently labeled label antibody reagent, and the measured excitation and responsivity spectrums inherent in the optical detection systems of the master and subordinate clinical diagnostic analyzers, normalization of subordinate analyzers to the master analyzer is performed at the factory. Using samples or specimens of known analyte concentrations, a standard calibration can likewise be performed at the factory. And furthermore, should it be required or desirable to change the label in the combination fluorescence label antibody reagent, this can be accomplished in the field using only the excitation and emission spectrums of the new fluorescence label.

One advantage of the inventive method is that by using solid inorganic photostable fluorophore, such as the preferred NIST SRM 2944 glass, as a reference material, a population of subordinate clinical diagnostic analyzers can be normalized to one master clinical diagnostic analyzer such that after a factory normalization and calibration the subordinate clinical diagnostic analyzers will have substantially the same response to a sample or specimen containing a fixed amount of analyte as would the master clinical diagnostic analyzer.

Furthermore, should it become necessary or desirable to change the fluorescence label in the combination fluorescence label antibody reagent, then the population of subordinate clinical diagnostic analyzers can be re-normalized (and retain the original factory calibration) by a simple procedure not requiring a total recalibration in the field.

For a general understanding of the disclosed methods, reference is made to the drawings. In the drawings, like reference numerals have been used to designate identical elements. In describing the disclosed methods, the following term(s) have been used in the description.

The term "$\xi$" (the Greek letter xi) or "emission" refers to one or more wavelengths of light generated as a result of fluorescence, specifically when "4" is used in an equation it stands for emission wavelength.

The term "responsivity" refers to the normalized output of an optical intensity measuring system as a function of a specific wavelength of light being input to that system.

The term "$\chi$" (the Greek letter chi) or "excitation" refers to one or more wavelengths of light generated to be used as a source to radiate a fluorescence complex, specifically when "$\chi$" is used in an equation it stands for excitation wavelength.

The term "absorbance" refers to the normalized extinction coefficient of a fluorescent dye.

The term "spectral distribution" or "shape function" refers to the relative intensity of an excitation or emission light beam as a function of wavelength.

The term "clinical diagnostic analyzer," "diagnostic analyzer," and "instrument" are taken to mean devices that accept a patient sample or specimen, analyze the sample or specimen for a specific analyte, and report the result of that analysis. These terms are meant to encompass clinical chemistry analyzers, immunohematology analyzers, lateral flow device readers, and the like.

The term "normalize" refers to the inventive method applied to two clinical diagnostic analyzers or instruments, a master instrument "A" and a subordinate instrument "B", such that the response of "B" to a specific sample or specimen containing a certain concentration of analyte can be converted to the response of "A" to the same sample or specimen by using a multiplicative factor when the assay method employed by the analyzers uses a common fluorescently labeled dyes.

The term "re-normalize" refers to the inventive method applied to two clinical diagnostic analyzers or instruments, a master instrument "A" and a subordinate instrument "B", such that the response of "B" to a specific sample or specimen containing a certain concentration of analyte can be converted to the response of "A" to the same sample or specimen by using a multiplicative factor when the assay method employed by the analyzers uses differing fluorescently labeled dyes.

Figure 3:
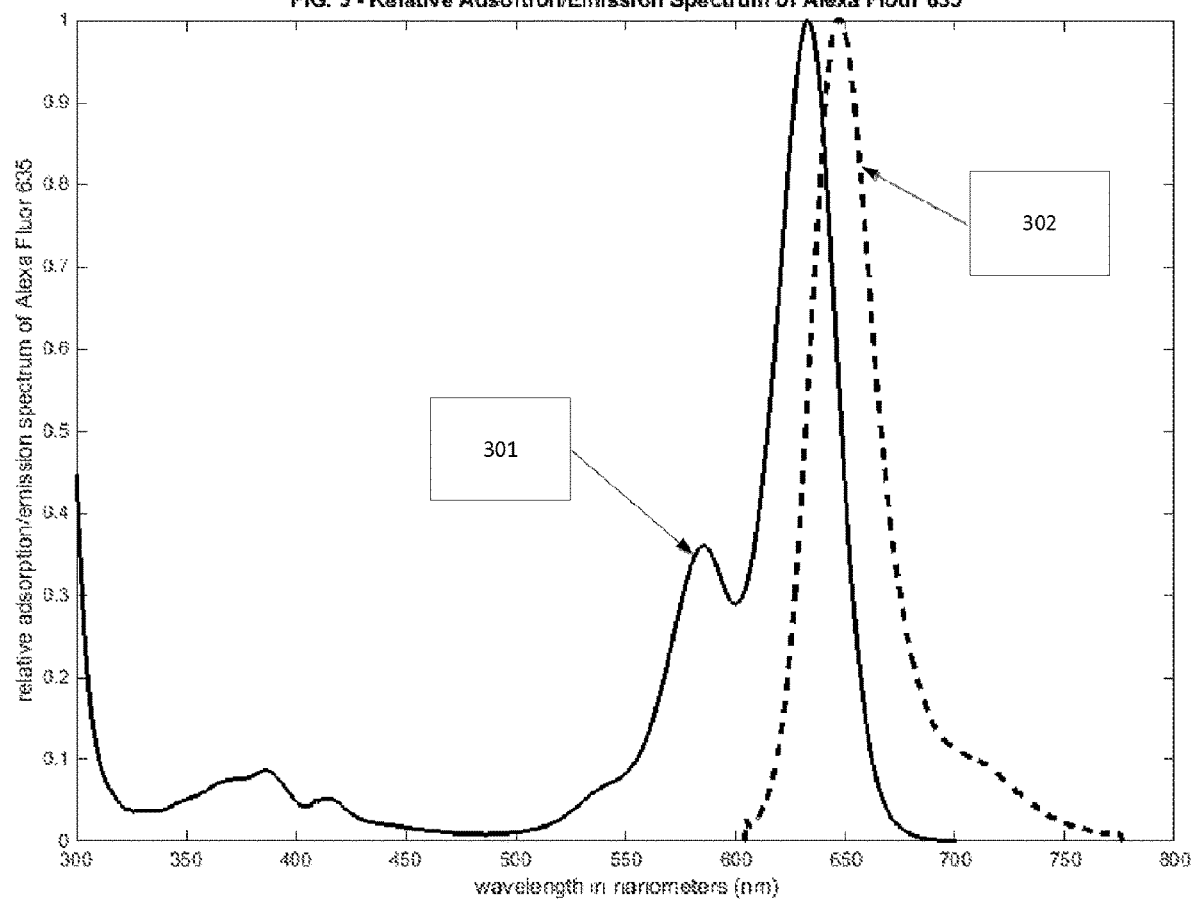
FIG. 3 is a graph of the relative adsorption and emission spectrum of Alexa Fluor® 635, a dye commonly used a fluorophore label.
Figure 4:
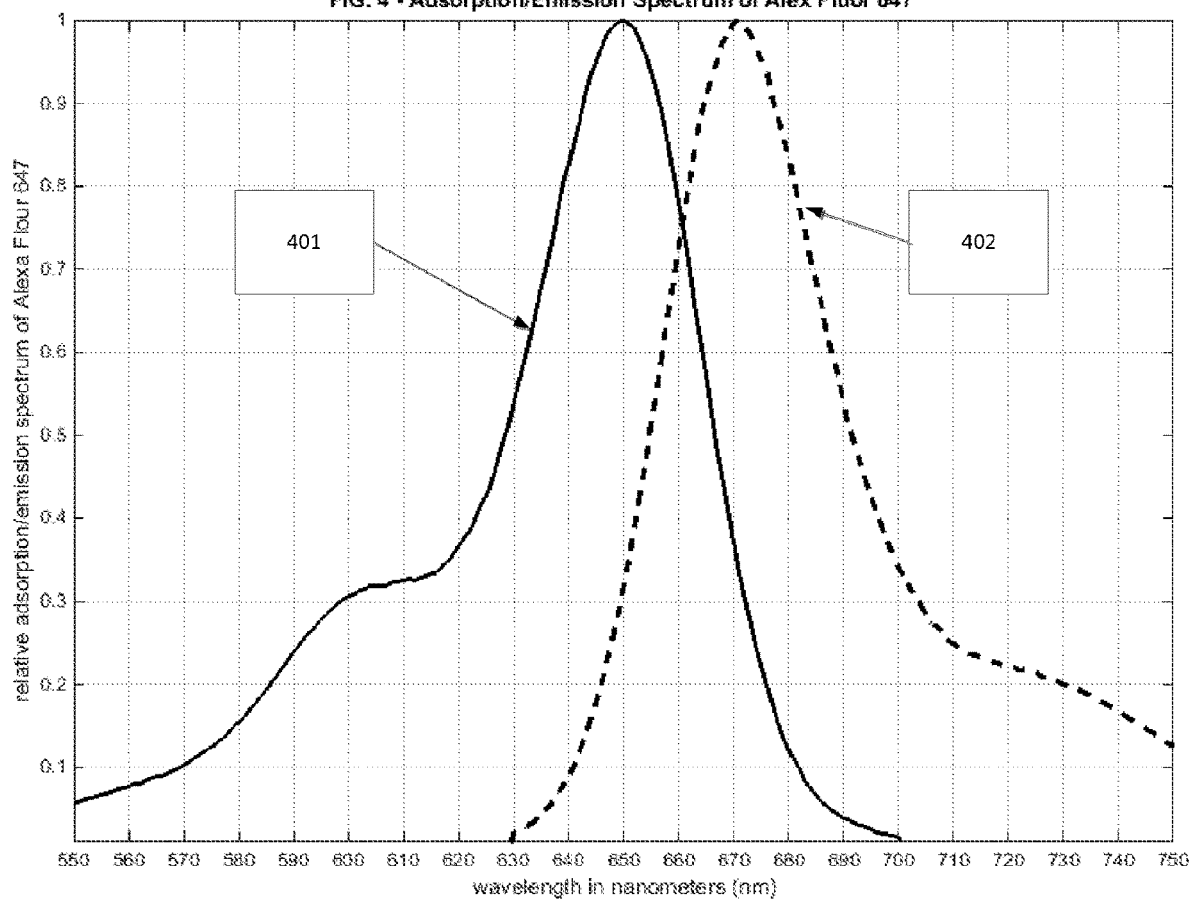
FIG. 4 is a graph of the relative adsorption and emission spectrum of Alexa Fluor® 647, another dye commonly used a fluorophore label.

The terms "Alexa Fluor® 635" and "Alexa Fluor® 647" refer to preferred organic fluorophores that can be used as fluorescent tags. These materials are made by INVITROGEN™. For example, the adsorption/emission spectrum of "Alexa Fluor® 635" is shown in FIG. 3 and "Alexa Fluor® 647" has a absorption maximum at 650 nm and an emission maximum at 671 nm as shown in FIG. 4. "Alexa Fluor® 635" is sometimes abbreviated as "AF 635" and "Alexa Fluor® 647" is sometimes abbreviated as "AF 647".

In FIG. 1 a combination fluorescently labeled antibody reagent 101 is added to a target analyte 102 (an antigen in this specific example) in the sample or specimen wherein the combination fluorescence label antibody reagent 101 binds to the analyte forming an antibody-analyte complex 103. Unbound combination fluorescence label antibody reagent 101 is subsequently removed. The bound antibody-analyte complex 103 is then exposed to an excitation light of specific wavelength causing a fluorescence emission proportional to the amount of analyte present to be generated shortly thereafter.

Figure 2:
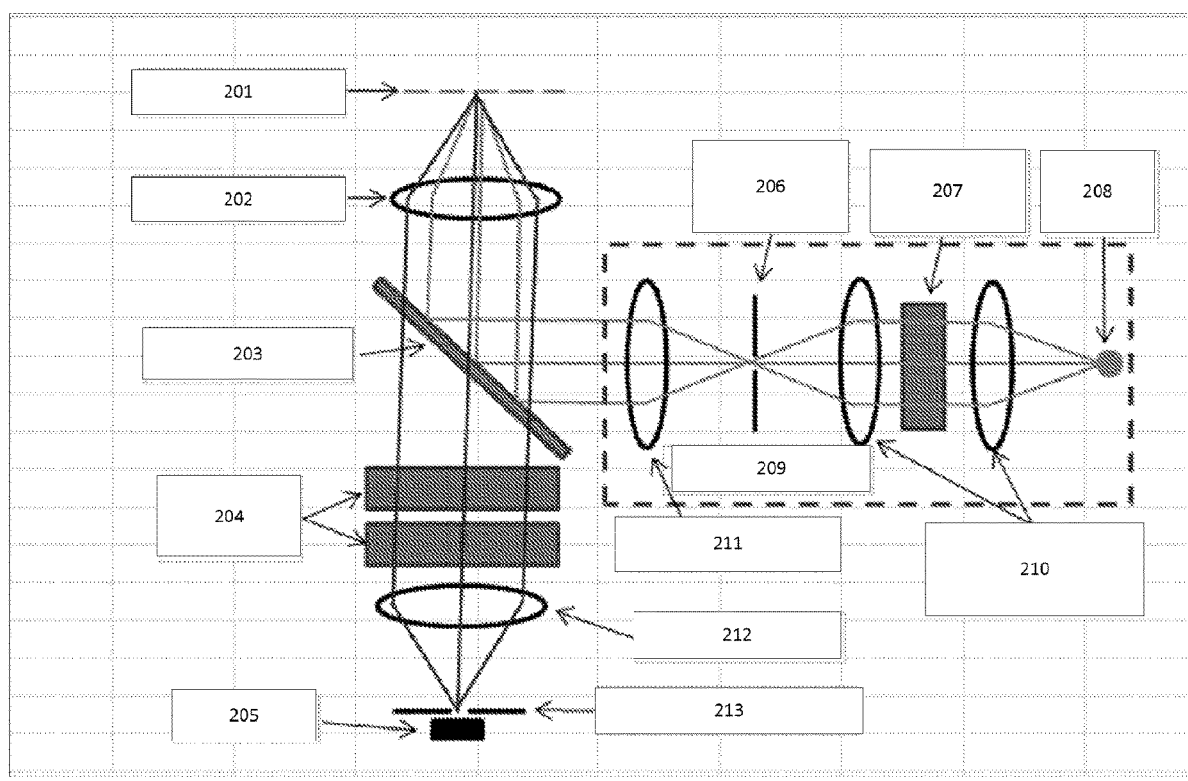
FIG. 2 is a schematic diagram of an optical detection system associated with a fluorescence detection analyzer.

In FIG. 2 the bound antibody-analyte complex 103 is captured in a very thin, well defined volume (normally some form of analysis slide, not shown) and presented at the sample plane 201. Excitation light is generated by the light emitting diode (LED) source 208 then collimated by condenser system lenses 210, filtered by the excitation filer 207, shaped by the excitation aperture 206 and the projection lens 211, redirected by a dichroic mirror 203, and then passed through an objective lens 202 that acts to converge the excitation light rays down to an area appropriate for the very thin, well defined volume. The excitation system components contained in the dashed rectangle are called the excitation arm 209 of the optical detection system. Any captured and tagged analyte in that volume fluoresces, and a portion of that emission is intercepted by the objective lens 202, passed through the dichroic mirror 203, further passed through at least one band pass filter 204, through a detector lens 212, and finally through a detection aperture 213. The emission light making it through the detection aperture 213 strikes the photodetector 205 and generates an electric current which is amplified into a usable signal.

At the photodetector 205, the excitation arm 209 of the optical detection system delivers a photon flux (some number of photons per second) with some spectral distribution (i.e., some mix of wavelengths). This can be described by $$\Phi(\chi) = \varphi \cdot S(\chi) \tag{1}$$

where $\varphi$ is a scalar (units=photons/second) and $S(\chi)$ is a unitless shape function where the maximum value of $S(\chi)$ is unity. The magnitude of $\varphi$ is determined by the output of the LED source 208, the attenuation properties of the filters 207 and, the attenuation properties of the lenses 210, 211, and 202, the reflective properties of the dichroic mirror 203, and the position tolerances of the optical elements. The characteristics of $S(\chi)$ are determined by the spectral properties of the LED source 208 and the transmission spectrum of the filter 207 and the reflective characteristics of the dichroic mirror 203.

If the NIST SRM 2944 glass is exposed to the photon flux $\Phi(\chi)$ of equation (1), a composite emission curve will be obtained that can be approximated by summation over small increments of $\Delta\chi$, i.e., the value of $S(\chi)$ at a particular $\chi$ times the normalized emission curve $EC_{glass}$ at that wavelength. That is, $$\Sigma_\chi S(\chi) \cdot ECglass(\chi,\xi) \tag{2}$$

The fluorescence photo flux $\Phi(\xi)$ emitted by the glass can be written as $$\Phi(\chi,\xi) = \psi \cdot \varphi \cdot \Sigma_{\xi,\chi} S(\xi\chi) \cdot Ecglass(\chi,\xi) \tag{3}$$

where $\psi$ is a scalar that is characteristic of the output of the NIST SRM 2944 glass.

The electrical signal (current) that is generated at the detector at a particular emission wavelength $\chi$ can be described by $$E(\xi) = \Phi(\xi) \cdot G \cdot S_R(\xi) \tag{4}$$

where G is a constant and $S_R(\xi)$ is a shape function such that the maximum value of $S_R(\xi)$ is unity. The magnitude of G is determined by the collection efficiency of the optics 202 and 212, the transmission efficiency of the dichroic mirror 203 and emission filters 204. The characteristics of $S_R(\xi)$ are determined by the spectral characteristics of the dichroic mirror 203, emission filters 204 and the spectral characteristics of the detector (photodiode) 205. The total electrical signal generated is $$E = \Sigma_\xi G \cdot S_R(\xi) = \Phi(\xi) = G \cdot \Sigma_\xi S_R(\xi) \cdot [\psi \cdot \varphi \cdot \Sigma_\chi S(\chi) \cdot \text{ECglass}(\chi, \xi)] \quad (5)$$

or, $$E = G \cdot \psi \cdot \varphi \cdot \Sigma_\xi S_R(\xi) \cdot [\Sigma_\chi S(\chi) \cdot \text{ECglass}(\chi, \xi)] \quad (6)$$

Suppose there is a master instrument "A" and a subordinate instrument "B" where Instrument "B" is to be normalized to instrument "A." Using eqn. (6), the ratio of the signals ($E_A$ and $E_B$) given by the two instruments in response to being presented with an identical NIST SRM 2944 glass target can be written as $$\frac{E_A}{E_B} = \left\{ \frac{G_A \cdot \psi \cdot \varphi_A \cdot \sum_\chi S_{RA}(\chi) \cdot \left[\sum_\xi S_A(\xi) \cdot \text{ECglass}(\xi, \chi)\right]}{G_B \cdot \psi \cdot \varphi_B \cdot \sum_\chi S_{RB}(\chi) \cdot \left[\sum_\xi S_B(\xi) \cdot \text{ECglass}(\xi, \chi)\right]} \right\} \text{ or,} \quad (7)$$

$$G_R = \left(\frac{G_A \cdot \varphi_A}{G_B \cdot \varphi_B}\right) = \left(\frac{E_A}{E_B}\right) \cdot \left\{ \frac{\sum_\chi S_{RB}(\chi) \cdot \left[\sum_\xi S_B(\xi) \cdot \text{ECglass}(\xi, \chi)\right]}{\sum_\chi S_{RA}(\chi) \cdot \left[\sum_\xi S_A(\xi) \cdot \text{ECglass}(\xi, \chi)\right]} \right\} \quad (8)$$

where $G_R$ is called the gain ratio. The responsivities of both instrument A and instrument B ($S_{RA}(\xi)$ and $S_{RE}(\xi)$, respectively) can be measured by presenting a constant intensity variable wavelength light source to each instrument in turn, sweeping the source through the range of wavelengths in the transmission band of the emission filters 204 and the dichroic mirror 203 while monitoring the signal generated by the respective instrument, then normalizing that signal by the maximum value obtained during that sweep. The emission spectra of both instruments, $S_A(\chi)$ and $S_Z(\chi)$, are easily measured by a spectrometer.

Consider now the case of a fluorescent label, specifically Alexa Fluor® 647, where in FIG. 4 the solid excitation curve 401 is designated by $S_{DYE}(\chi)$. The equivalent digital values for $S_{DYE}(\chi)$ are presented in Table 4. Also for Alexa Fluor® 647, in FIG. 4 the dashed emission curve 402 is designated by $S_{DYE}(\xi)$. The equivalent digital values for $S_{DYE}(\xi)$ are presented in Table 5.

The photon flux $\Phi_{DYE}(\xi)$ emitted by the fluorescent label (dye) can be written as $$\Phi_{DYE}(\xi) = \varphi_{DYE} \cdot \varphi \cdot [\Sigma_\xi S(\xi) \cdot S_{DYE}(\xi)] \cdot S_{DYE}(\chi) \quad (9)$$

where $\varphi_{DYE}$ is a scalar that is characteristic of the output of the fluorescence label (dye).

Rewriting eqn. (6) in terms of the fluorescence label (dye) gives $$E = G \cdot \varphi_{DYE} \cdot \varphi \cdot \left\{ \sum_\xi S_R(\xi) \cdot \left[\sum_\chi S(\chi) \cdot S_{DYE}(\chi)\right] \cdot S_{DYE}(\chi) \right\} \text{ and,} \quad (10)$$

$$\frac{E_A}{E_B} = \quad (11)$$

$$\left\{ \frac{G_A \cdot \varphi_{DYE} \cdot \varphi_A \cdot \sum_\xi S_{RA}(\xi) \cdot \left[\sum_\chi S_A(\chi) \cdot S_{DYE}(\chi)\right] \cdot S_{DYE}(\xi)}{G_B \cdot \varphi_{DYE} \cdot \varphi_B \cdot \sum_\xi S_{RB}(\xi) \cdot \left[\sum_\chi S_B(\chi) \cdot S_{DYE}(\chi)\right] \cdot S_{DYE}(\xi)} \right\} \text{ or,}$$

$$E_A = E_B \cdot G_R \left\{ \frac{\sum_\chi S_{RA}(\xi) \cdot \left[\sum_\chi S_A(\chi) \cdot S_{DYE}(\chi)\right] \cdot S_{DYE}(\xi)}{\sum_\chi S_{RB}(\xi) \cdot \left[\sum_\xi S_B(\chi) \cdot S_{DYE}(\chi)\right] \cdot S_{DYE}(\xi)} \right\} \quad (12)$$

Therefore, we can transform the response $E_B$ from analyzer "B" to the response $E_A$ that would be seen by the master analyzer "A" using eqn. (12).

This allows introduction of new fluorescence labels (dyes) to subordinate field instruments and allowing those subordinate field instruments to be re-normalized to a master analyzer "A" by simply providing the absorption and emission spectrum of the new fluorescence label (dye) and using eqn. (12).

In summary, the following is conducted in the factory for each subordinate instrument:
  Measure $S_Z(\chi)$ and store this information on the instrument.
  Measure $S_{RZ}(\xi)$ and store this information on the instrument.
  The Gain Ratio of each instrument is determined by scanning the NIST SRN 2944 calibration slide as a target, and then applying eqn. (8).

Exemplary Example of Factory Normalization

In this example, Analyzer AP106 is selected as the master instrument and Analyzer AP115 is selected as the subordinate instrument. The goal of this factory normalization is to determine the relationship between the two analyzers with respect to their individual responses to the same sample. This means that a response to a particular sample for the subordinate instrument can be converted to the response of the master instrument by multiplying the response of the subordinate instrument by the gain ratio and the remainder of the eqn. (12) to the right of $G_R$ (as derived above and to be determined for this example below). The initial data gathering steps can be listed as follows:

1. Obtain the normalized excitation intensity spectrum of AP106 (see Table 1 for the digital spectrophotometric data).
2. Obtain the normalized excitation intensity spectrum of AP115 (see Table 1 for the digital spectrophotometric data).
3. Obtain the normalized responsivity intensity spectrum of AP106 (see Table 2 for the digital spectrophotometric data).
4. Obtain the normalized responsivity intensity spectrum of AP115 (see Table 2 for the digital spectrophotometric data).
5. Obtain the normalized excitation/emission spectrum of NIST SRM 2944 glass (see Table 3A, 3B, and 3C for the digital spectrophotometric data).

6. Read the NIST SRM 2944 glass as a target in AP106 obtaining the response value for $E_A$ of 2181.705 relative fluorescence units (RFU).
7. Read the NIST SRM 2944 glass as a target in AP115 obtaining the response value for $E_Z$ of 2035.274 RFU.
8. Calculate the Gain ratio of AP106 to AP115 using eqn. (8) where the numerator in brackets has the value 123.9541 and the denominator in brackets has the value 126.4753 with a result as follows:

$$G_R = \left(\frac{2181.705}{2035.274}\right) * \left(\frac{123.9541}{126.4763}\right) = 1.0506$$

Note that the ratio (123.9541/126.4763) expresses the difference in signal between the two instruments based on spectral differences. Whereas the gain ratio $G_R$ expresses differences due to non-spectral differences (e.g., one instrument may have a slightly brighter illumination LED or somewhat more efficient receiver optics).

9. Obtain the relative absorption spectrum of the fluorescent label (dye) used in the analysis. In this case Alexa Fluor® 647 is being used and the associated digital spectrophotometric data is presented in Table 4.
10. Obtain the relative emission intensity of the fluorescent label (dye) used in the analysis. In this case Alexa Fluor® 647 is being used and the associated digital spectrophotometric data is presented in Table 5.
11. Using eqn. (12), the normalization factor between AP115 responses and AP106 responses can be determined as follows where the numerator in eqn. (12) is 122.1005 and the denominator in eqn. (12) is 117.6860:

$$\frac{E_A}{E_Z} = (1.0506) * \left(\frac{117.6860}{122.1005}\right) = 1.0126$$

That is, to convert a response from AP115 to a response normalized to AP106 when making measurements with Alexa Fluor® 647, we must multiply the AP115 responses by 1.0126.

Exemplary Example of Field Re-Normalization

In this example, subordinate instrument AP115 has been previously normalized to master instrument AP106 and it is desired to introduce a new fluorescent label (dye). The prior analysis allows introduction of new fluorescent labels (dyes) to subordinate field instruments and allowing those subordinate field instruments to normalize to the master analyzer by simply providing the absorption and emission spectrum of the new dye and using eqn. (12) above. The method is outlined as follows:

1. Obtain the relative absorption spectrum of the fluorescent label (dye) used in the analysis. In this case Alexa Fluor® 635 is being used, see FIG. 3, solid excitation curve 301 and the associated digital spectrophotometric data is presented in Table 6.
2. Obtain the relative emission intensity of the fluorescent label (dye) used in the analysis. In this case Alexa Fluor® 635 is being used, see FIG. 3, dashed emission curve 302 and the associated digital spectrophotometric data is presented in Table 7.
3. Using eqn. (12), the normalization factor between AP115 responses and AP106 responses can be determined as follows where the numerator in eqn. (12) is 44.02245 and the denominator in eqn. (12) is 45.2193:

$$\frac{E_A}{E_Z} = (1.0506) * \left(\frac{44.02245}{45.2194}\right) = 1.0274$$

That is, to convert a signal from AP115 to a signal normalized to AP106 when making measurements with Alexa Fluor® 635 as opposed to Alexa Fluor® 647, we must multiply the AP115 signals by 1.01274. Note that the Gain Ratio is not dependent upon the fluorescent label (dye) and remains constant.

In practice, when a new fluorescence label (dye) is introduced to a subordinate field instrument, the quantity $$\Sigma_\chi S_{RB}(\xi) \cdot [\Sigma_{\xi_\chi} S_B(\chi) \cdot S_{DYE}(\chi)] \cdot S_{DYE}(\xi)$$

will be provided to that instrument along with $$S_{DYE}(\xi) \text{ and } S_{DYE}(\chi)$$

so that it is capable of running assays that make use of that new fluorescence label (dye).

Exemplary Example of Factory Linear Calibration

Figure 5:
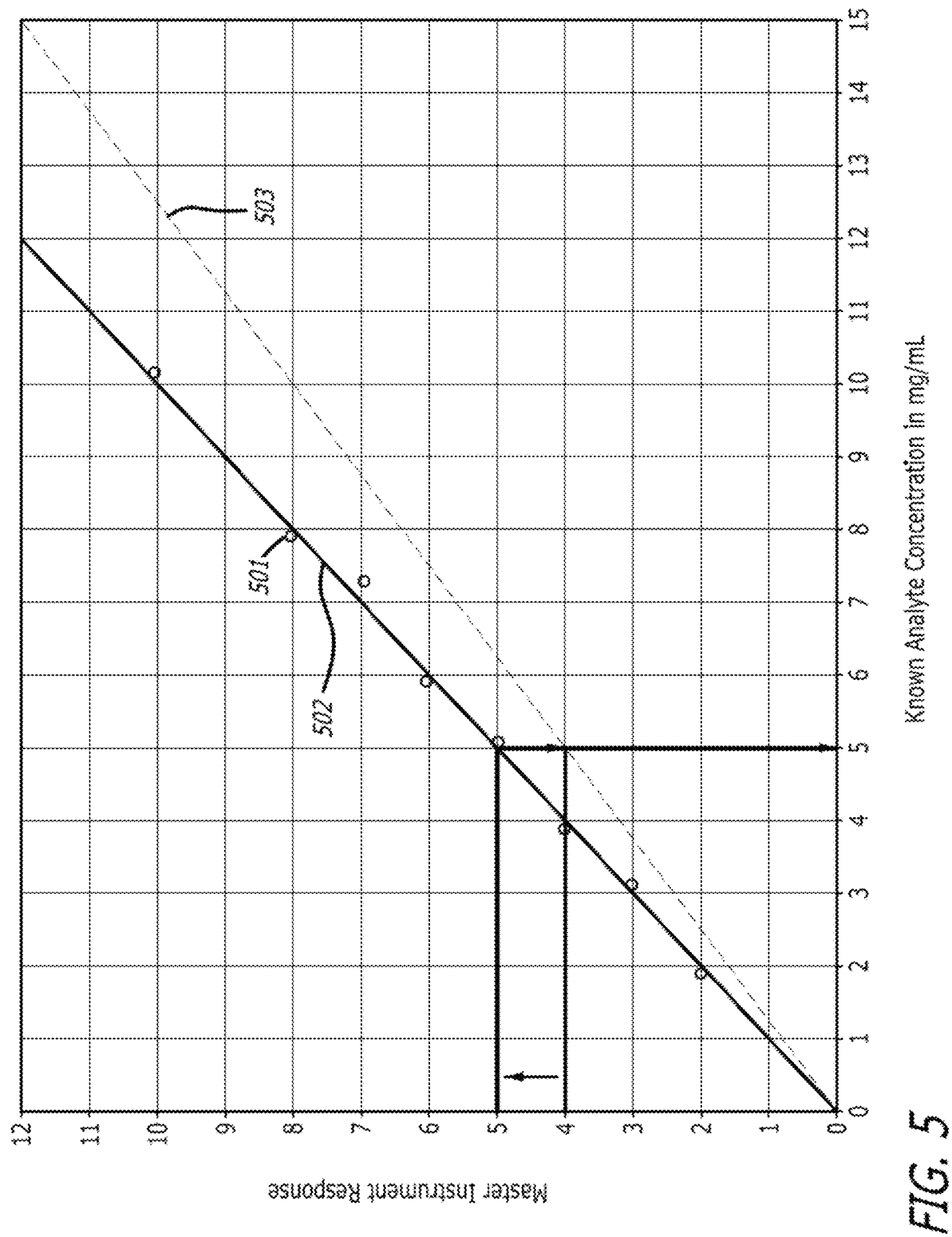
FIG. 5 is a graph of an example master instrument linear calibration curve.

In this example, a standard calibration procedure will be conducted with samples or specimens of known analyte concentration. The procedure will utilize 10 samples having known analyte concentrations of 1, 2, 3, 4, 5, 6, 7, 8, 9, and 10 ng/mL. The master instrument responses were observed to be 1.15, 1.90, 3.10, 3.90, 5.05, 5.95, 7.30, 7.90, 8.90, and 10.20. For fluorometry, the amount of emitted light is frequently proportional to amount of analyte present in the sample or specimen; hence, a linear calibration curve is usually employed. Here the known concentration values, which are known without error, are used as the predictor variable and the master instrument responses, containing measurement error, are used as the response variable. This situation is known to satisfy the requirement for using ordinary least squares (OLS) regression. The above data and the fitted regression line are shown in FIG. 5. The data points 501 and the fitted OLS regression line (shown as a solid black line) 502 indicate a close correlation for the master instrument.

For the master instrument, the instrument response to a sample or specimen (as indicated by a y-axis value) is traced back to the right horizontally to the fitted linear calibration line and then traced vertically to the x-axis to obtain the estimate of the analyte concentration in the sample or specimen. For example, in FIG. 5, if the master instrument response to a sample or specimen is 5, then tracing to the right, the horizontal line intercepts the linear calibration line and tracing down a value of approximately 5 on the x-axis is obtained.

For the subordinate instruments, subordinate instrument response to a sample or specimen is multiplied by the Gain Ratio and everything to the right of $E_Z$ in eqn. (1) such that the resulting response can be used just as if it were obtained from the master instrument to obtain an estimate of the analyte concentration in the sample or specimen. For this specific case, the subordinate instrument would produce a response of 4 and subsequently that response would be multiplied by the gain factor of 1.25 to yield an equivalent master instrument response of 5. Also using the master calibration curve produces an estimated analyte concentration of approximately 5.

Exemplary Example of Field Linear Re-Calibration

In this example, a new fluorescent label (dye) has been introduced into the analysis chemistry and the subordinate instruments in the field have been re-normalized. For this situation there are two methods that can be used to obtain appropriate estimates of the analyte concentration in the sample or specimen as follows:

1. The subordinate instrument response can be multiplied by the normalization factor and the old factory calibration curve can be used. In FIG. 5, for a subordinate instrument response of 4 and a normalization factor of 1.25, this is represented by the up arrow indicating that 4*1.25=5 is the equivalent master instrument response. Starting a 5 on the y-axis and tracing right to the master linear calibration line 502 and then down to the x-axis produces an estimate of 5.
2. Alternatively, a new linear calibration 503 curve can be constructed by multiplying the slope of the old linear calibration curve 502 by the inverse of the normalization factor. The new calibration curve 503 would then, as in in FIG. 5, have a slope of 1.005*(1/1.25)=0.804. The estimate of the analyte concentration in the sample or specimen would then be obtained by starting on the y-axis at the subordinate instrument response (4) then tracing to the right until the new linear calibration curve is encountered and then moving down to the x-axis. It is clear from FIG. 5 that this procedure or the procedure 1 above that both result in the same analyte concentration estimates.

Exemplary Example of Factory Non-Linear Calibration

In this example, the amount of emitted light is not proportional to amount of analyte present in the sample or specimen; hence, a linear calibration curve cannot be used. In a manner similar to the linear calibration example, a series of 10 samples or specimens of known analyte concentrations is prepared and a non-linear sigmoidal function 601 is fitted to the data points 602. Hence, for the master instrument, a y-axis response is converted into an estimate of analyte concentration, by starting at the y-axis value, tracing right until the calibration curve is encountered and then tracing down to the x-axis to obtain the analyte concentration estimate.

Exemplary Example of Field Non-Linear Re-Calibration

Figure 6:
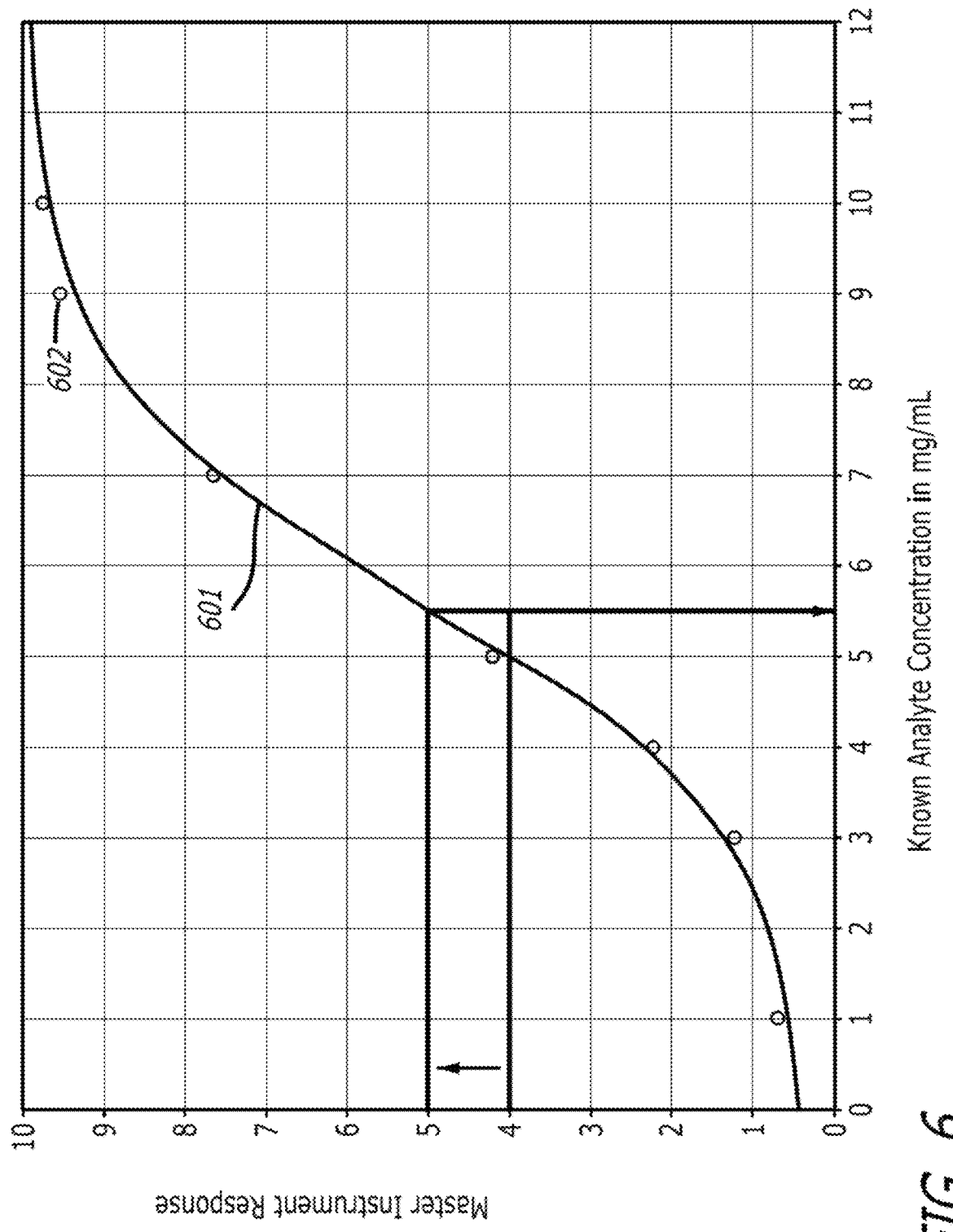
FIG. 6 is a graph of an example master instrument nonlinear calibration curve.

In this example, FIG. 6 shows a non-linear (s-shaped) calibration curve 601. Assuming that the normalization factor is 1.25 between the master and subordinate instruments, a subordinate instrument response of 4 would generate an equivalent master instrument response of (4*1.25)= 5 which would produce an estimated analyte concentration of approximately 5½. Unlike the linear calibration case, the slope of the non-linear calibration curve cannot be easily adjusted such that the raw subordinate instrument response can be used. Here it is necessary to multiply the subordinate instrument response by the normalization factor to obtain the equivalent master instrument response and then use the master instrument calibration curve.

Simulation Test of Normalization Factor Effectiveness

To test the effectiveness of the normalization process, an initial Monte Carlo simulation was conducted where 10,000 simulated fluorescence analyzers were presented with a fixed amount of Alexa Fluor® 647 (AF 647) fluorescence label (dye) or a fixed amount of bismuth-doped glass as used in the NIST SRM 2944 standard. Sources of variation were as follows:

1. Incubation temperature was allowed to vary between 36° C. and 38° C.
2. The bandpass characteristics of 3 optical filters in the detection arm of the optical detection system were allowed to vary (according the manufacturers specification)
3. The excitation wavelength was allowed to vary between 630 nm and 636 nm.

After 10,000 simulated analyzers were configured according to the above, the model generated the statistics of a variety of responses. FIG. 7 shows the resulting histogram 701 of responses to simulated samples using AF 647 dye. There is about a +/−25% range in the population response. FIG. 8 shows the population of ratios of each individual analyzer's response to AF 647 and the NIST SRM 2944 standard. The resulting histogram of responses 801 shows a spread of about +/−20%. Clearly, the raw response of the NIST SRM 2944 does a poor job in predicting the response of the instrument to the samples using AF 647. However, if the same analysis is repeated where a normalization factor is employed and measurement noise (error) in the following is allowed:

1. Noise associated with the analyzer aligning and reading the calibration slide. A value was used of 0.5% CV that should be achievable with 4 load and align events each with 4 reads of the fluorescent label (dye). The alignment process was actually a fairly significant source of variability.
2. Noise associated with the characterization of the analyzer's excitation and responsivity spectra by factory calibration instrumentation. It was estimated that each data point had a 0.25% CV imprecision.
3. Noise associated with the characterization of the analyzer's incubation temperature. Noise of one standard deviation was taken to be 0.067° C. This creates an error because of the temperature sensitivity differences between the NIST SRM 2944 glass (−0.25% per ° C.) and the AF 647 fluorescent label (dye) (−1.2% per ° C.).

FIG. 9 contains the resulting histogram of errors 901 which indicates that the overall analyte estimation error has been reduced to about a range of +/−1%.

It will be apparent to those skilled in the art that various modifications and variations can be made to the article of manufacture disclosed herein. Thus, it is intended that the present invention cover such modifications and variations, provided they come within the scope of the appended claims and their equivalents.

The disclosure of all publications cited above is expressly incorporated herein by reference in their entireties to the same extent as if each were incorporated by reference individually.

TABLE 1

Normalized Excitation Intensity of Analyzers AP106 and AP115

| Wavelength (nm) | Normalized Excitation Intensity AP106 | Normalized Excitation Intensity AP115 |
| --- | --- | --- |
| 610 | 0.002 | 0.001 |
| 611 | 0.001 | 0 |
| 612 | 0 | 0.002 |
| 613 | 0 | 0.001 |
| 614 | 0 | 0.002 |
| 615 | 0.002 | 0.002 |
| 616 | 0.002 | 0.003 |
| 617 | 0.002 | 0.002 |
| 618 | 0.001 | 0.002 |
| 619 | 0.002 | 0.004 |
| 620 | 0.002 | 0.006 |
| 621 | 0.002 | 0.003 |
| 622 | 0.003 | 0.006 |
| 623 | 0.002 | 0.003 |
| 624 | 0.002 | 0.006 |
| 625 | 0.003 | 0.004 |
| 626 | 0.003 | 0.004 |
| 627 | 0.003 | 0.008 |
| 628 | 0.004 | 0.008 |
| 629 | 0.005 | 0.01 |

TABLE 1-continued

Normalized Excitation Intensity of Analyzers AP106 and AP115

| Wavelength (nm) | Normalized Excitation Intensity AP106 | Normalized Excitation Intensity AP115 |
|---|---|---|
| 630 | 0.007 | 0.01 |
| 631 | 0.018 | 0.015 |
| 632 | 0.107 | 0.08 |
| 633 | 0.749 | 0.588 |
| 634 | 1 | 1 |
| 635 | 1 | 1 |
| 636 | 0.902 | 0.888 |
| 637 | 0.783 | 0.776 |
| 638 | 0.649 | 0.664 |
| 639 | 0.531 | 0.547 |
| 640 | 0.422 | 0.433 |
| 641 | 0.33 | 0.339 |
| 642 | 0.264 | 0.287 |
| 643 | 0.201 | 0.229 |
| 644 | 0.17 | 0.195 |
| 645 | 0.138 | 0.169 |
| 646 | 0.106 | 0.134 |
| 647 | 0.089 | 0.114 |
| 648 | 0.071 | 0.094 |
| 649 | 0.052 | 0.077 |
| 650 | 0.018 | 0.033 |
| 651 | 0.011 | 0.023 |
| 652 | 0.014 | 0.025 |
| 653 | 0.015 | 0.026 |
| 654 | 0.013 | 0.026 |
| 655 | 0.016 | 0.026 |
| 656 | 0.016 | 0.028 |
| 657 | 0.017 | 0.029 |
| 658 | 0.016 | 0.028 |
| 659 | 0.019 | 0.029 |
| 660 | 0.02 | 0.033 |

TABLE 2

Normalized Responsivity of Analyzers AP106 and AP115

| Wavelength (nm) | Normalized Responsivity AP106 | Normalized Responsivity AP115 |
|---|---|---|
| 660 | 0.000 | 0 |
| 661 | 0.000 | 0 |
| 662 | 0.000 | 0 |
| 663 | 0.000 | 0 |
| 664 | 0.000 | 0 |
| 665 | 0.001 | 0.003 |
| 666 | 0.007 | 0.033 |
| 667 | 0.076 | 0.169 |
| 668 | 0.296 | 0.503 |
| 669 | 0.721 | 0.857 |
| 670 | 0.931 | 0.944 |
| 671 | 0.963 | 0.963 |
| 672 | 0.976 | 0.974 |
| 673 | 0.984 | 0.981 |
| 674 | 0.987 | 0.986 |
| 675 | 0.989 | 0.987 |
| 676 | 0.987 | 0.988 |
| 677 | 0.989 | 0.99 |
| 678 | 0.990 | 0.991 |
| 679 | 0.990 | 0.992 |
| 680 | 0.992 | 0.995 |
| 681 | 0.996 | 0.999 |
| 682 | 0.999 | 1 |
| 683 | 1.000 | 0.999 |
| 684 | 1.000 | 0.998 |
| 685 | 0.998 | 0.997 |
| 686 | 0.997 | 0.996 |
| 687 | 0.995 | 0.995 |
| 688 | 0.994 | 0.991 |
| 689 | 0.991 | 0.977 |
| 690 | 0.973 | 0.942 |
| 691 | 0.932 | 0.886 |
| 692 | 0.874 | 0.825 |
| 693 | 0.813 | 0.758 |
| 694 | 0.747 | 0.677 |
| 695 | 0.661 | 0.577 |
| 696 | 0.557 | 0.494 |
| 697 | 0.476 | 0.444 |
| 698 | 0.431 | 0.361 |
| 699 | 0.348 | 0.186 |
| 700 | 0.147 | 0.039 |
| 701 | 0.028 | 0.007 |
| 702 | 0.006 | 0.002 |
| 703 | 0.002 | 0.001 |
| 704 | 0.001 | 0 |
| 705 | 0.000 | 0 |
| 706 | 0.000 | 0 |
| 707 | 0.000 | 0 |
| 708 | 0.000 | 0 |
| 709 | 0.000 | 0 |
| 710 | 0.000 | 0 |

TABLE 3A

Normalized Excitation/Emission Spectrum of NIST SRM 2944 Glass
(Excitation Range of 630 nm to 638 nm)

| Emission λ | Excitation λ 630 nm | Excitation λ 631 nm | Excitation λ 632 nm | Excitation λ 633 nm | Excitation λ 634 nm | Excitation λ 635 nm | Excitation λ 636 nm | Excitation λ 637 nm | Excitation λ 638 nm |
|---|---|---|---|---|---|---|---|---|---|
| 660 nm | 0.34549 | 0.33956 | 0.33023 | 0.32210 | 0.31582 | 0.30802 | 0.29942 | 0.29206 | 0.28678 |
| 661 nm | 0.35772 | 0.34993 | 0.34102 | 0.33521 | 0.32420 | 0.31786 | 0.31031 | 0.30331 | 0.29702 |
| 662 nm | 0.36896 | 0.36160 | 0.35298 | 0.34501 | 0.33518 | 0.33052 | 0.32255 | 0.31517 | 0.30726 |
| 663 nm | 0.38392 | 0.37425 | 0.36760 | 0.35853 | 0.34984 | 0.34257 | 0.33388 | 0.32481 | 0.31928 |
| 664 nm | 0.39699 | 0.39019 | 0.37935 | 0.37124 | 0.36228 | 0.35438 | 0.34674 | 0.33794 | 0.33082 |
| 665 nm | 0.41212 | 0.40123 | 0.39331 | 0.38280 | 0.37668 | 0.36648 | 0.35845 | 0.35121 | 0.34225 |
| 666 nm | 0.42312 | 0.41395 | 0.40579 | 0.39620 | 0.38547 | 0.37763 | 0.36996 | 0.36349 | 0.35335 |
| 667 nm | 0.43856 | 0.42995 | 0.41957 | 0.41035 | 0.40103 | 0.39396 | 0.38782 | 0.37574 | 0.36701 |
| 668 nm | 0.45547 | 0.44361 | 0.43619 | 0.42548 | 0.41737 | 0.40622 | 0.39897 | 0.39043 | 0.38220 |
| 669 nm | 0.46686 | 0.45881 | 0.45030 | 0.44020 | 0.43125 | 0.42149 | 0.41088 | 0.40334 | 0.39448 |
| 670 nm | 0.48376 | 0.47254 | 0.46310 | 0.45249 | 0.44417 | 0.43516 | 0.42428 | 0.41614 | 0.40696 |
| 671 nm | 0.49900 | 0.48850 | 0.47782 | 0.46725 | 0.46050 | 0.44937 | 0.43894 | 0.43078 | 0.42308 |
| 672 nm | 0.51526 | 0.50339 | 0.49342 | 0.48204 | 0.47241 | 0.46424 | 0.45153 | 0.44363 | 0.43545 |
| 673 nm | 0.52976 | 0.51942 | 0.50948 | 0.49668 | 0.48821 | 0.47739 | 0.46932 | 0.45703 | 0.44964 |
| 674 nm | 0.54523 | 0.53238 | 0.52233 | 0.51327 | 0.50100 | 0.49177 | 0.48550 | 0.47438 | 0.46410 |
| 675 nm | 0.56020 | 0.55060 | 0.53721 | 0.52785 | 0.51904 | 0.50735 | 0.49493 | 0.48674 | 0.47747 |
| 676 nm | 0.57498 | 0.56199 | 0.55172 | 0.53999 | 0.53040 | 0.51979 | 0.51242 | 0.50051 | 0.49118 |

TABLE 3A-continued

Normalized Excitation/Emission Spectrum of NIST SRM 2944 Glass
(Excitation Range of 630 nm to 638 nm)

| Emission λ | Excitation λ 630 nm | Excitation λ 631 nm | Excitation λ 632 nm | Excitation λ 633 nm | Excitation λ 634 nm | Excitation λ 635 nm | Excitation λ 636 nm | Excitation λ 637 nm | Excitation λ 638 nm |
|---|---|---|---|---|---|---|---|---|---|
| 677 nm | 0.58950 | 0.57750 | 0.56461 | 0.55440 | 0.54368 | 0.53247 | 0.52302 | 0.51226 | 0.50388 |
| 678 nm | 0.60211 | 0.58952 | 0.57800 | 0.56891 | 0.55852 | 0.54858 | 0.53826 | 0.52581 | 0.51567 |
| 679 nm | 0.61899 | 0.60799 | 0.59682 | 0.58456 | 0.57233 | 0.56236 | 0.55323 | 0.54233 | 0.53079 |
| 680 nm | 0.63571 | 0.62416 | 0.61074 | 0.59914 | 0.59201 | 0.57863 | 0.56691 | 0.55660 | 0.54640 |
| 681 nm | 0.65119 | 0.63768 | 0.62549 | 0.61473 | 0.60436 | 0.59340 | 0.58563 | 0.57149 | 0.55993 |
| 682 nm | 0.66555 | 0.65240 | 0.64012 | 0.63216 | 0.62131 | 0.60897 | 0.59902 | 0.58693 | 0.57436 |
| 683 nm | 0.68193 | 0.66992 | 0.65779 | 0.64809 | 0.63722 | 0.62455 | 0.61273 | 0.60073 | 0.59146 |
| 684 nm | 0.69631 | 0.68391 | 0.67507 | 0.66524 | 0.65241 | 0.63948 | 0.62716 | 0.61849 | 0.60849 |
| 685 nm | 0.71191 | 0.69806 | 0.68725 | 0.67714 | 0.66511 | 0.65241 | 0.64263 | 0.63119 | 0.62026 |
| 686 nm | 0.72485 | 0.71479 | 0.70406 | 0.68995 | 0.68133 | 0.66728 | 0.65735 | 0.64566 | 0.63500 |
| 687 nm | 0.74255 | 0.72878 | 0.71670 | 0.70500 | 0.69137 | 0.68162 | 0.67083 | 0.65914 | 0.64813 |
| 688 nm | 0.75576 | 0.74375 | 0.73268 | 0.72053 | 0.70923 | 0.69377 | 0.68607 | 0.67391 | 0.66217 |
| 689 nm | 0.76864 | 0.75885 | 0.74478 | 0.73313 | 0.72375 | 0.70988 | 0.69743 | 0.68662 | 0.67722 |
| 690 nm | 0.78382 | 0.76997 | 0.76045 | 0.74728 | 0.73515 | 0.72335 | 0.70914 | 0.69861 | 0.68906 |
| 691 nm | 0.79956 | 0.78754 | 0.77465 | 0.76029 | 0.75030 | 0.73720 | 0.72440 | 0.71331 | 0.70199 |
| 692 nm | 0.81396 | 0.80383 | 0.78749 | 0.77734 | 0.76329 | 0.75653 | 0.74207 | 0.72610 | 0.71928 |
| 693 nm | 0.83057 | 0.81751 | 0.80235 | 0.79029 | 0.77913 | 0.76468 | 0.75417 | 0.74559 | 0.73236 |
| 694 nm | 0.84067 | 0.83041 | 0.81674 | 0.80409 | 0.78959 | 0.77977 | 0.77171 | 0.75430 | 0.74347 |
| 695 nm | 0.85438 | 0.84491 | 0.83224 | 0.81948 | 0.80731 | 0.79462 | 0.78425 | 0.77103 | 0.76048 |
| 696 nm | 0.87009 | 0.85938 | 0.84873 | 0.83082 | 0.81966 | 0.80737 | 0.79485 | 0.78336 | 0.77542 |
| 697 nm | 0.88250 | 0.87089 | 0.85528 | 0.84315 | 0.83042 | 0.82140 | 0.80550 | 0.79784 | 0.78385 |
| 698 nm | 0.89514 | 0.88045 | 0.86759 | 0.85686 | 0.84831 | 0.83358 | 0.82316 | 0.81013 | 0.79985 |
| 699 nm | 0.90298 | 0.89312 | 0.87890 | 0.86638 | 0.85667 | 0.84326 | 0.82821 | 0.82216 | 0.80856 |
| 700 nm | 0.91588 | 0.90337 | 0.88566 | 0.87942 | 0.86508 | 0.85438 | 0.84473 | 0.83000 | 0.81662 |
| 701 nm | 0.92416 | 0.91464 | 0.90406 | 0.88702 | 0.87977 | 0.86353 | 0.85174 | 0.84086 | 0.83206 |
| 702 nm | 0.93556 | 0.92286 | 0.91033 | 0.90265 | 0.88861 | 0.87638 | 0.86469 | 0.85091 | 0.83958 |
| 703 nm | 0.94464 | 0.92976 | 0.92086 | 0.90517 | 0.89383 | 0.88544 | 0.86948 | 0.86311 | 0.84956 |
| 704 nm | 0.95172 | 0.94134 | 0.92452 | 0.91652 | 0.90713 | 0.89536 | 0.87968 | 0.86897 | 0.85622 |
| 705 nm | 0.96445 | 0.94477 | 0.94112 | 0.92292 | 0.91835 | 0.90046 | 0.88922 | 0.87454 | 0.86843 |
| 706 nm | 0.97045 | 0.95788 | 0.95020 | 0.93519 | 0.92430 | 0.91298 | 0.89947 | 0.88786 | 0.87275 |
| 707 nm | 0.98165 | 0.96576 | 0.95652 | 0.94251 | 0.93266 | 0.92085 | 0.90612 | 0.89648 | 0.88468 |
| 708 nm | 0.98706 | 0.97196 | 0.96089 | 0.95344 | 0.93654 | 0.92808 | 0.91656 | 0.90630 | 0.89525 |
| 709 nm | 0.99556 | 0.97889 | 0.96765 | 0.95331 | 0.94638 | 0.93428 | 0.91999 | 0.91175 | 0.90195 |
| 10 nm | 1.00000 | 0.98436 | 0.97267 | 0.95728 | 0.95293 | 0.93689 | 0.92688 | 0.91517 | 0.90614 |

TABLE 3B

Normalized Excitation/Emission Spectrum of NIST SRM 2944 Glass
(Excitation Range of 639 nm to 647 nm)

| Emission λ | Excitation λ 639 nm | Excitation λ 640 nm | Excitation λ 641 nm | Excitation λ 642 nm | Excitation λ 643 nm | Excitation λ 644 nm | Excitation λ 645 nm | Excitation λ 646 nm | Excitation λ 647 nm |
|---|---|---|---|---|---|---|---|---|---|
| 660 nm | 0.27911 | 0.27185 | 0.26452 | 0.25901 | 0.25135 | 0.24785 | 0.23902 | 0.23594 | 0.23167 |
| 661 nm | 0.28995 | 0.28094 | 0.27595 | 0.26975 | 0.26183 | 0.25660 | 0.25034 | 0.24434 | 0.23738 |
| 662 nm | 0.30021 | 0.29278 | 0.28366 | 0.27893 | 0.27137 | 0.26506 | 0.25849 | 0.25475 | 0.24551 |
| 663 nm | 0.31158 | 0.30306 | 0.29624 | 0.28923 | 0.28192 | 0.27477 | 0.26761 | 0.26381 | 0.25771 |
| 664 nm | 0.32579 | 0.31660 | 0.30891 | 0.30162 | 0.29329 | 0.28622 | 0.27996 | 0.27318 | 0.26751 |
| 665 nm | 0.33523 | 0.32804 | 0.31951 | 0.31145 | 0.30404 | 0.29706 | 0.28971 | 0.28405 | 0.27674 |
| 666 nm | 0.34443 | 0.33741 | 0.33095 | 0.32289 | 0.31555 | 0.30954 | 0.30037 | 0.29415 | 0.28606 |
| 667 nm | 0.35897 | 0.35202 | 0.34426 | 0.33462 | 0.32785 | 0.32013 | 0.31137 | 0.30462 | 0.29813 |
| 668 nm | 0.37347 | 0.36475 | 0.35725 | 0.34954 | 0.34101 | 0.33435 | 0.32413 | 0.31842 | 0.30883 |
| 669 nm | 0.38590 | 0.37578 | 0.36848 | 0.36081 | 0.35423 | 0.34506 | 0.33669 | 0.33021 | 0.31995 |
| 670 nm | 0.39942 | 0.38957 | 0.38234 | 0.37419 | 0.36530 | 0.35769 | 0.34828 | 0.34083 | 0.33246 |
| 671 nm | 0.41226 | 0.40227 | 0.39425 | 0.38722 | 0.37700 | 0.37099 | 0.35937 | 0.35261 | 0.34617 |
| 672 nm | 0.42698 | 0.41667 | 0.40787 | 0.39921 | 0.39076 | 0.38205 | 0.37587 | 0.36751 | 0.36019 |
| 673 nm | 0.43981 | 0.43263 | 0.42078 | 0.41488 | 0.40511 | 0.39550 | 0.38413 | 0.37933 | 0.36968 |
| 674 nm | 0.45412 | 0.44475 | 0.43423 | 0.42555 | 0.41891 | 0.40664 | 0.40179 | 0.39040 | 0.38156 |
| 675 nm | 0.46688 | 0.45568 | 0.44866 | 0.43969 | 0.43155 | 0.42118 | 0.41290 | 0.40209 | 0.39604 |
| 676 nm | 0.48073 | 0.47073 | 0.46036 | 0.45261 | 0.44345 | 0.43448 | 0.42458 | 0.41554 | 0.40821 |
| 677 nm | 0.49339 | 0.48261 | 0.47440 | 0.46501 | 0.45556 | 0.44665 | 0.43779 | 0.42705 | 0.41914 |
| 678 nm | 0.50585 | 0.49479 | 0.48616 | 0.47395 | 0.46894 | 0.45722 | 0.44763 | 0.43920 | 0.43098 |
| 679 nm | 0.51982 | 0.51266 | 0.50154 | 0.49310 | 0.48233 | 0.47278 | 0.46128 | 0.45399 | 0.44395 |
| 680 nm | 0.53750 | 0.52403 | 0.51516 | 0.50484 | 0.49664 | 0.48659 | 0.47725 | 0.46932 | 0.45799 |
| 681 nm | 0.54993 | 0.54309 | 0.52722 | 0.51938 | 0.50822 | 0.50052 | 0.49061 | 0.48152 | 0.47112 |
| 682 nm | 0.56629 | 0.55587 | 0.54475 | 0.53432 | 0.52582 | 0.51478 | 0.50473 | 0.49179 | 0.48528 |
| 683 nm | 0.58150 | 0.56910 | 0.55823 | 0.55040 | 0.54175 | 0.53082 | 0.51382 | 0.50954 | 0.49833 |
| 684 nm | 0.59626 | 0.58549 | 0.57161 | 0.56348 | 0.55152 | 0.54292 | 0.53166 | 0.52173 | 0.51299 |
| 685 nm | 0.60793 | 0.59802 | 0.58731 | 0.57827 | 0.56494 | 0.55536 | 0.54588 | 0.53733 | 0.52397 |
| 686 nm | 0.62306 | 0.61432 | 0.59987 | 0.58847 | 0.58125 | 0.57004 | 0.55623 | 0.54756 | 0.53980 |
| 687 nm | 0.63897 | 0.62686 | 0.61389 | 0.60637 | 0.59225 | 0.58169 | 0.57082 | 0.56042 | 0.55440 |

TABLE 3B-continued

Normalized Excitation/Emission Spectrum of NIST SRM 2944 Glass
(Excitation Range of 639 nm to 647 nm)

| Emission λ | Excitation λ 639 nm | Excitation λ 640 nm | Excitation λ 641 nm | Excitation λ 642 nm | Excitation λ 643 nm | Excitation λ 644 nm | Excitation λ 645 nm | Excitation λ 646 nm | Excitation λ 647 nm |
|---|---|---|---|---|---|---|---|---|---|
| 688 nm | 0.65070 | 0.64051 | 0.62660 | 0.61937 | 0.60813 | 0.59850 | 0.58688 | 0.57622 | 0.56656 |
| 689 nm | 0.66528 | 0.65593 | 0.64145 | 0.63173 | 0.62156 | 0.60885 | 0.59913 | 0.58936 | 0.57848 |
| 690 nm | 0.67591 | 0.66659 | 0.65579 | 0.64355 | 0.63498 | 0.62411 | 0.61001 | 0.60088 | 0.59155 |
| 691 nm | 0.69007 | 0.67921 | 0.67153 | 0.65932 | 0.64955 | 0.63466 | 0.62460 | 0.61504 | 0.60294 |
| 692 nm | 0.70667 | 0.69526 | 0.68166 | 0.67403 | 0.66398 | 0.65158 | 0.63974 | 0.62803 | 0.61911 |
| 693 nm | 0.72124 | 0.71108 | 0.69785 | 0.68725 | 0.67435 | 0.66574 | 0.65178 | 0.64059 | 0.63174 |
| 694 nm | 0.73618 | 0.72511 | 0.71025 | 0.69935 | 0.69291 | 0.68093 | 0.66894 | 0.65427 | 0.64630 |
| 695 nm | 0.74781 | 0.73408 | 0.72458 | 0.71131 | 0.70287 | 0.69274 | 0.68404 | 0.67117 | 0.65988 |
| 696 nm | 0.76197 | 0.74705 | 0.73821 | 0.72851 | 0.71581 | 0.70501 | 0.69595 | 0.68463 | 0.67072 |
| 697 nm | 0.77559 | 0.76219 | 0.75201 | 0.74229 | 0.72922 | 0.71381 | 0.70528 | 0.69469 | 0.68236 |
| 698 nm | 0.78480 | 0.77821 | 0.76451 | 0.75169 | 0.73934 | 0.73148 | 0.71671 | 0.70809 | 0.69831 |
| 699 nm | 0.79627 | 0.78192 | 0.77271 | 0.76445 | 0.74887 | 0.74191 | 0.73119 | 0.71864 | 0.70551 |
| 700 nm | 0.80875 | 0.79373 | 0.78544 | 0.77658 | 0.75904 | 0.75085 | 0.73887 | 0.72835 | 0.71694 |
| 701 nm | 0.82209 | 0.80501 | 0.79439 | 0.78660 | 0.77305 | 0.75991 | 0.75274 | 0.74043 | 0.73168 |
| 702 nm | 0.82774 | 0.81885 | 0.80382 | 0.79314 | 0.78494 | 0.76795 | 0.76162 | 0.75244 | 0.73873 |
| 703 nm | 0.83419 | 0.82483 | 0.81362 | 0.80471 | 0.79361 | 0.78072 | 0.77200 | 0.75994 | 0.74859 |
| 704 nm | 0.85007 | 0.83739 | 0.82417 | 0.81290 | 0.80216 | 0.78760 | 0.77658 | 0.77141 | 0.75671 |
| 705 nm | 0.85479 | 0.84240 | 0.83616 | 0.82402 | 0.80819 | 0.79908 | 0.78787 | 0.77910 | 0.76791 |
| 706 nm | 0.86330 | 0.85349 | 0.84185 | 0.82907 | 0.81821 | 0.80705 | 0.79720 | 0.79097 | 0.77680 |
| 707 nm | 0.87533 | 0.85838 | 0.85322 | 0.84090 | 0.82425 | 0.82040 | 0.80514 | 0.79461 | 0.78601 |
| 708 nm | 0.87902 | 0.87176 | 0.85697 | 0.84603 | 0.83478 | 0.82536 | 0.81204 | 0.80294 | 0.79474 |
| 709 nm | 0.88992 | 0.87785 | 0.86414 | 0.85678 | 0.84718 | 0.83483 | 0.82128 | 0.81027 | 0.79945 |
| 710 nm | 0.89614 | 0.88186 | 0.87009 | 0.86187 | 0.85009 | 0.83553 | 0.82659 | 0.82019 | 0.80709 |

TABLE 3C

Normalized Excitation/Emission Spectrum of NIST SRM 2944 Glass
(Excitation Range of 648 nm to 655 nm)

| Emission λ | Excitation λ 648 nm | Excitation λ 649 nm | Excitation λ 650 nm | Excitation λ 651 nm | Excitation λ 652 nm | Excitation λ 653 nm | Excitation λ 654 nm | Excitation λ 655 nm |
|---|---|---|---|---|---|---|---|---|
| 660 nm | 0.22307 | 0.21862 | 0.21234 | 0.20707 | 0.20283 | 0.19818 | 0.19434 | 0.19945 |
| 661 nm | 0.23246 | 0.22495 | 0.22051 | 0.21522 | 0.21042 | 0.20606 | 0.20101 | 0.19704 |
| 662 nm | 0.24082 | 0.23491 | 0.22850 | 0.22278 | 0.21853 | 0.21427 | 0.20871 | 0.20469 |
| 663 nm | 0.25162 | 0.24477 | 0.23645 | 0.23321 | 0.22687 | 0.22342 | 0.21649 | 0.21101 |
| 664 nm | 0.26040 | 0.25317 | 0.24677 | 0.24088 | 0.23597 | 0.23001 | 0.22623 | 0.21969 |
| 665 nm | 0.26949 | 0.26390 | 0.25812 | 0.25110 | 0.24596 | 0.23964 | 0.23430 | 0.22715 |
| 666 nm | 0.28044 | 0.27314 | 0.26748 | 0.25994 | 0.25424 | 0.24853 | 0.24207 | 0.23773 |
| 667 nm | 0.29144 | 0.28471 | 0.27705 | 0.27033 | 0.26524 | 0.25781 | 0.25273 | 0.24673 |
| 668 nm | 0.30424 | 0.29720 | 0.28912 | 0.28144 | 0.27547 | 0.26940 | 0.26398 | 0.25484 |
| 669 nm | 0.31480 | 0.30627 | 0.29854 | 0.29071 | 0.28693 | 0.28079 | 0.27288 | 0.26618 |
| 670 nm | 0.32499 | 0.31901 | 0.31044 | 0.30256 | 0.29579 | 0.29054 | 0.28507 | 0.27643 |
| 671 nm | 0.33695 | 0.33028 | 0.32168 | 0.31329 | 0.30769 | 0.29974 | 0.29415 | 0.28682 |
| 672 nm | 0.35154 | 0.34241 | 0.33350 | 0.32585 | 0.31779 | 0.31141 | 0.30409 | 0.29844 |
| 673 nm | 0.36206 | 0.35317 | 0.34607 | 0.33680 | 0.32910 | 0.32296 | 0.31487 | 0.30683 |
| 674 nm | 0.37249 | 0.36744 | 0.35645 | 0.34757 | 0.34151 | 0.33411 | 0.32546 | 0.31931 |
| 675 nm | 0.38513 | 0.37680 | 0.37132 | 0.36100 | 0.35348 | 0.34651 | 0.33660 | 0.33213 |
| 676 nm | 0.39830 | 0.38919 | 0.38056 | 0.37358 | 0.36698 | 0.35720 | 0.34857 | 0.33951 |
| 677 nm | 0.40869 | 0.40122 | 0.39366 | 0.38278 | 0.37662 | 0.36828 | 0.36053 | 0.35445 |
| 678 nm | 0.42164 | 0.41460 | 0.40237 | 0.39651 | 0.38763 | 0.37992 | 0.37141 | 0.36531 |
| 679 nm | 0.43349 | 0.42601 | 0.41659 | 0.40618 | 0.39905 | 0.39172 | 0.38240 | 0.37497 |
| 680 nm | 0.45032 | 0.44037 | 0.43041 | 0.42288 | 0.41332 | 0.40584 | 0.39514 | 0.38954 |
| 681 nm | 0.46247 | 0.45195 | 0.44170 | 0.43335 | 0.42404 | 0.41838 | 0.40698 | 0.39738 |
| 682 nm | 0.47560 | 0.46757 | 0.45571 | 0.44799 | 0.43733 | 0.42737 | 0.42113 | 0.41283 |
| 683 nm | 0.48577 | 0.48138 | 0.46818 | 0.46202 | 0.45340 | 0.44252 | 0.43443 | 0.42419 |
| 684 nm | 0.50254 | 0.49332 | 0.48344 | 0.47429 | 0.46366 | 0.45632 | 0.44797 | 0.43761 |
| 685 nm | 0.51655 | 0.50645 | 0.49770 | 0.48468 | 0.47363 | 0.46564 | 0.45579 | 0.45023 |
| 686 nm | 0.52648 | 0.51785 | 0.50762 | 0.49781 | 0.48867 | 0.48044 | 0.46849 | 0.45994 |
| 687 nm | 0.54333 | 0.53133 | 0.52121 | 0.50969 | 0.50280 | 0.49216 | 0.48218 | 0.47060 |
| 688 nm | 0.55721 | 0.54386 | 0.53374 | 0.52499 | 0.51500 | 0.50429 | 0.49431 | 0.48410 |
| 689 nm | 0.56593 | 0.55658 | 0.54389 | 0.53722 | 0.52538 | 0.51817 | 0.50748 | 0.49488 |
| 690 nm | 0.58141 | 0.57162 | 0.55913 | 0.55088 | 0.53814 | 0.53011 | 0.51971 | 0.50912 |
| 691 nm | 0.59442 | 0.58090 | 0.57177 | 0.56071 | 0.55108 | 0.54204 | 0.53196 | 0.52437 |
| 692 nm | 0.60802 | 0.59742 | 0.58562 | 0.57557 | 0.56810 | 0.55619 | 0.54572 | 0.53520 |
| 693 nm | 0.61806 | 0.61048 | 0.60156 | 0.58885 | 0.57871 | 0.56838 | 0.56005 | 0.55053 |
| 694 nm | 0.63058 | 0.62611 | 0.60978 | 0.60223 | 0.59056 | 0.58141 | 0.57157 | 0.56200 |
| 695 nm | 0.64782 | 0.63917 | 0.62542 | 0.61524 | 0.60570 | 0.59401 | 0.58392 | 0.57225 |
| 696 nm | 0.66502 | 0.65048 | 0.64032 | 0.62578 | 0.61605 | 0.60660 | 0.59913 | 0.58509 |
| 697 nm | 0.67196 | 0.66391 | 0.65115 | 0.64087 | 0.63057 | 0.61819 | 0.60895 | 0.59958 |
| 698 nm | 0.68370 | 0.67084 | 0.66268 | 0.65501 | 0.64005 | 0.63120 | 0.62074 | 0.60900 |

TABLE 3C-continued

Normalized Excitation/Emission Spectrum of NIST SRM 2944 Glass
(Excitation Range of 648 nm to 655 nm)

| Emission λ | Excitation λ 648 nm | Excitation λ 649 nm | Excitation λ 650 nm | Excitation λ 651 nm | Excitation λ 652 nm | Excitation λ 653 nm | Excitation λ 654 nm | Excitation λ 655 nm |
|---|---|---|---|---|---|---|---|---|
| 699 nm | 0.69510 | 0.68551 | 0.67157 | 0.66240 | 0.65280 | 0.64155 | 0.62950 | 0.62099 |
| 700 nm | 0.70688 | 0.69564 | 0.68446 | 0.67570 | 0.66249 | 0.65235 | 0.63999 | 0.62854 |
| 701 nm | 0.71596 | 0.70828 | 0.69418 | 0.68431 | 0.67283 | 0.66207 | 0.64923 | 0.64099 |
| 702 nm | 0.72934 | 0.71764 | 0.70616 | 0.69496 | 0.68405 | 0.67309 | 0.66337 | 0.65407 |
| 703 nm | 0.73582 | 0.72721 | 0.71421 | 0.70465 | 0.69440 | 0.68092 | 0.67209 | 0.66131 |
| 704 nm | 0.74703 | 0.73430 | 0.72530 | 0.71079 | 0.70244 | 0.69213 | 0.68112 | 0.67269 |
| 705 nm | 0.75439 | 0.74683 | 0.73679 | 0.72472 | 0.71410 | 0.70194 | 0.69075 | 0.67711 |
| 706 nm | 0.76728 | 0.75756 | 0.74230 | 0.72972 | 0.72297 | 0.71639 | 0.69829 | 0.69141 |
| 707 nm | 0.77383 | 0.76340 | 0.75084 | 0.74204 | 0.73260 | 0.71983 | 0.71077 | 0.69931 |
| 708 nm | 0.78383 | 0.77095 | 0.76037 | 0.75105 | 0.73926 | 0.72877 | 0.71753 | 0.70840 |
| 709 nm | 0.79008 | 0.78214 | 0.76971 | 0.75695 | 0.74783 | 0.73712 | 0.72513 | 0.71338 |
| 710 nm | 0.79852 | 0.78818 | 0.77288 | 0.76500 | 0.75695 | 0.74266 | 0.73116 | 0.72153 |

TABLE 4

Relative Absorption of Alexa Fluor ® 647 vs. Excitation Wavelength

| Excitation Wavelength (nm) | AF 647 Relative Absorption |
|---|---|
| 630 | 0.5403 |
| 631 | 0.5666 |
| 632 | 0.5917 |
| 633 | 0.6202 |
| 634 | 0.6501 |
| 635 | 0.6780 |
| 636 | 0.7052 |
| 637 | 0.7364 |
| 638 | 0.7706 |
| 639 | 0.8041 |
| 640 | 0.8279 |
| 641 | 0.8537 |
| 642 | 0.8796 |
| 643 | 0.9080 |
| 644 | 0.9325 |
| 645 | 0.9504 |
| 646 | 0.9666 |
| 647 | 0.9826 |
| 648 | 0.9920 |
| 649 | 0.9977 |
| 650 | 1.0000 |
| 651 | 0.9956 |
| 652 | 0.9905 |
| 653 | 0.9747 |
| 654 | 0.9590 |
| 655 | 0.9391 |

TABLE 5

Relative Emission Intensity of Alexa Fluor ® 647 vs. Wavelength

| Emission Wavelength nm | Relative Emission Intensity |
|---|---|
| 660 | 0.7259 |
| 661 | 0.7660 |
| 662 | 0.8055 |
| 663 | 0.8477 |
| 664 | 0.8856 |
| 665 | 0.9075 |
| 666 | 0.9320 |
| 667 | 0.9507 |
| 668 | 0.9738 |
| 669 | 0.9841 |
| 670 | 0.9973 |
| 671 | 1.0000 |
| 672 | 0.9928 |
| 673 | 0.9827 |
| 674 | 0.9688 |
| 675 | 0.9522 |
| 676 | 0.9390 |
| 677 | 0.9057 |
| 678 | 0.8844 |
| 679 | 0.8615 |
| 680 | 0.8339 |
| 681 | 0.8042 |
| 682 | 0.7709 |
| 683 | 0.7475 |
| 684 | 0.7092 |
| 685 | 0.6830 |
| 686 | 0.6567 |
| 687 | 0.6199 |
| 688 | 0.5930 |
| 689 | 0.5717 |
| 690 | 0.5372 |
| 691 | 0.5095 |
| 692 | 0.4887 |
| 693 | 0.4652 |
| 694 | 0.4451 |
| 695 | 0.4267 |
| 696 | 0.4064 |
| 697 | 0.3899 |
| 698 | 0.3731 |
| 699 | 0.3564 |
| 700 | 0.3406 |
| 701 | 0.3303 |
| 702 | 0.3180 |
| 703 | 0.3064 |
| 704 | 0.2973 |
| 705 | 0.2845 |
| 706 | 0.2749 |
| 707 | 0.2693 |
| 708 | 0.2625 |
| 709 | 0.2528 |
| 710 | 0.2494 |

TABLE 6

Relative Absorption of Alexa Fluor ® 635 vs. Excitation Wavelength

| Excitation Wavelength (nm) | AF 635 Relative Absorption |
|---|---|
| 300 | 0.446957202 |
| 301 | 0.396653342 |
| 302 | 0.343918215 |

TABLE 6-continued

Relative Absorption of Alexa Fluor ® 635 vs. Excitation Wavelength

| Excitation Wavelength (nm) | AF 635 Relative Absorption |
|---|---|
| 303 | 0.295014831 |
| 304 | 0.248871208 |
| 305 | 0.210934787 |
| 306 | 0.179785525 |
| 307 | 0.154627416 |
| 308 | 0.133971426 |
| 309 | 0.119256131 |
| 310 | 0.105066014 |
| 311 | 0.092018933 |
| 312 | 0.08507731 |
| 313 | 0.07738499 |
| 314 | 0.070948979 |
| 315 | 0.066119397 |
| 316 | 0.061795427 |
| 317 | 0.056687809 |
| 318 | 0.052547137 |
| 319 | 0.049170548 |
| 320 | 0.045328507 |
| 321 | 0.04315571 |
| 322 | 0.040128211 |
| 323 | 0.038543407 |
| 324 | 0.038780253 |
| 325 | 0.038624759 |
| 326 | 0.036226444 |
| 327 | 0.038645354 |
| 328 | 0.037966741 |
| 329 | 0.03680311 |
| 330 | 0.037255176 |
| 331 | 0.03745083 |
| 332 | 0.036782515 |
| 333 | 0.037184122 |
| 334 | 0.037286068 |
| 335 | 0.037224283 |
| 336 | 0.037347854 |
| 337 | 0.037430235 |
| 338 | 0.037647515 |
| 339 | 0.038295235 |
| 340 | 0.038718467 |
| 341 | 0.040220889 |
| 342 | 0.041395847 |
| 343 | 0.042836484 |
| 344 | 0.043783865 |
| 345 | 0.045607573 |
| 346 | 0.04683196 |
| 347 | 0.048283924 |
| 348 | 0.049325013 |
| 349 | 0.050344477 |
| 350 | 0.051013822 |
| 351 | 0.052280429 |
| 352 | 0.053093941 |
| 353 | 0.054082512 |
| 354 | 0.055019595 |
| 355 | 0.056027732 |
| 356 | 0.057377749 |
| 357 | 0.058983148 |
| 358 | 0.060467034 |
| 359 | 0.061568879 |
| 360 | 0.063565587 |
| 361 | 0.06554273 |
| 362 | 0.067015289 |
| 363 | 0.068705128 |
| 364 | 0.070186955 |
| 365 | 0.071350586 |
| 366 | 0.072462729 |
| 367 | 0.073389514 |
| 368 | 0.073986776 |
| 369 | 0.074636556 |
| 370 | 0.07504846 |
| 371 | 0.075469633 |
| 372 | 0.07612868 |
| 373 | 0.076315067 |
| 374 | 0.075985544 |
| 375 | 0.076880406 |
| 376 | 0.076726972 |
| 377 | 0.07677846 |
| 378 | 0.077796894 |
| 379 | 0.078806061 |
| 380 | 0.079362132 |
| 381 | 0.081236299 |
| 382 | 0.082286655 |
| 383 | 0.083790108 |
| 384 | 0.085303857 |
| 385 | 0.086354214 |
| 386 | 0.086777446 |
| 387 | 0.086087506 |
| 388 | 0.085169988 |
| 389 | 0.083501774 |
| 390 | 0.081287787 |
| 391 | 0.078620704 |
| 392 | 0.075923758 |
| 393 | 0.072740764 |
| 394 | 0.069394039 |
| 395 | 0.065687926 |
| 396 | 0.062051838 |
| 397 | 0.058406481 |
| 398 | 0.055009297 |
| 399 | 0.05188809 |
| 400 | 0.048953269 |
| 401 | 0.046184239 |
| 402 | 0.044638567 |
| 403 | 0.042949758 |
| 404 | 0.042712913 |
| 405 | 0.042549181 |
| 406 | 0.043176305 |
| 407 | 0.044144281 |
| 408 | 0.045503567 |
| 409 | 0.052867393 |
| 410 | 0.048532096 |
| 411 | 0.049653507 |
| 412 | 0.051084875 |
| 413 | 0.051868524 |
| 414 | 0.052475054 |
| 415 | 0.052331917 |
| 416 | 0.051981798 |
| 417 | 0.051003524 |
| 418 | 0.049582453 |
| 419 | 0.047851424 |
| 420 | 0.04626662 |
| 421 | 0.044124716 |
| 422 | 0.041313467 |
| 423 | 0.039376485 |
| 424 | 0.036791783 |
| 425 | 0.034980432 |
| 426 | 0.032899284 |
| 427 | 0.031241367 |
| 428 | 0.029399123 |
| 429 | 0.027843153 |
| 430 | 0.027060535 |
| 431 | 0.026195535 |
| 432 | 0.024899065 |
| 433 | 0.024362559 |
| 434 | 0.023754999 |
| 435 | 0.023806488 |
| 436 | 0.022746863 |
| 437 | 0.022489422 |
| 438 | 0.021737696 |
| 439 | 0.021623393 |
| 440 | 0.02098494 |
| 441 | 0.020500952 |
| 442 | 0.02033722 |
| 443 | 0.020048887 |
| 444 | 0.019687441 |
| 445 | 0.019410435 |
| 446 | 0.018935715 |
| 447 | 0.018514542 |
| 448 | 0.018081012 |
| 449 | 0.017495078 |
| 450 | 0.01718512 |

TABLE 6-continued

Relative Absorption of Alexa Fluor ® 635 vs. Excitation Wavelength

| Excitation Wavelength (nm) | AF 635 Relative Absorption |
|---|---|
| 451 | 0.017031685 |
| 452 | 0.016351013 |
| 453 | 0.015918513 |
| 454 | 0.015301686 |
| 455 | 0.015095733 |
| 456 | 0.014672501 |
| 457 | 0.014488174 |
| 458 | 0.014127757 |
| 459 | 0.013766311 |
| 460 | 0.013405894 |
| 461 | 0.013417222 |
| 462 | 0.012995019 |
| 463 | 0.012892043 |
| 464 | 0.012686091 |
| 465 | 0.012531627 |
| 466 | 0.012098097 |
| 467 | 0.011984823 |
| 468 | 0.011593514 |
| 469 | 0.011378293 |
| 470 | 0.01108996 |
| 471 | 0.010760436 |
| 472 | 0.010460776 |
| 473 | 0.010513294 |
| 474 | 0.010307341 |
| 475 | 0.010163175 |
| 476 | 0.010060198 |
| 477 | 0.010019008 |
| 478 | 0.009782163 |
| 479 | 0.009524722 |
| 480 | 0.009410419 |
| 481 | 0.009380556 |
| 482 | 0.00910252 |
| 483 | 0.008936728 |
| 484 | 0.008947026 |
| 485 | 0.00884405 |
| 486 | 0.008721508 |
| 487 | 0.008752401 |
| 488 | 0.008833752 |
| 489 | 0.008927461 |
| 490 | 0.009071627 |
| 491 | 0.009349663 |
| 492 | 0.009452639 |
| 493 | 0.009668889 |
| 494 | 0.009957222 |
| 495 | 0.010213633 |
| 496 | 0.010285716 |
| 497 | 0.010523591 |
| 498 | 0.010862383 |
| 499 | 0.011192936 |
| 500 | 0.01126502 |
| 501 | 0.011512162 |
| 502 | 0.011995121 |
| 503 | 0.012314347 |
| 504 | 0.012850853 |
| 505 | 0.013324543 |
| 506 | 0.013818829 |
| 507 | 0.014385198 |
| 508 | 0.014941269 |
| 509 | 0.015310953 |
| 510 | 0.016062679 |
| 511 | 0.016670239 |
| 512 | 0.01765881 |
| 513 | 0.01830859 |
| 514 | 0.019122102 |
| 515 | 0.020306327 |
| 516 | 0.021489524 |
| 517 | 0.022808648 |
| 518 | 0.024063928 |
| 519 | 0.025599303 |
| 520 | 0.027102755 |
| 521 | 0.028935731 |
| 522 | 0.030593647 |
| 523 | 0.032591385 |
| 524 | 0.034639581 |
| 525 | 0.036410771 |
| 526 | 0.038831741 |
| 527 | 0.040675014 |
| 528 | 0.042887972 |
| 529 | 0.045257454 |
| 530 | 0.047501305 |
| 531 | 0.049591721 |
| 532 | 0.05193031 |
| 533 | 0.054257571 |
| 534 | 0.056286202 |
| 535 | 0.05850019 |
| 536 | 0.060364058 |
| 537 | 0.062247492 |
| 538 | 0.06398779 |
| 539 | 0.065666301 |
| 540 | 0.066943206 |
| 541 | 0.068456956 |
| 542 | 0.069580426 |
| 543 | 0.070702866 |
| 544 | 0.072215586 |
| 545 | 0.073399812 |
| 546 | 0.074913562 |
| 547 | 0.076458204 |
| 548 | 0.078312805 |
| 549 | 0.079991317 |
| 550 | 0.082370066 |
| 551 | 0.085067012 |
| 552 | 0.087806178 |
| 553 | 0.091400047 |
| 554 | 0.095117486 |
| 555 | 0.099360105 |
| 556 | 0.104055818 |
| 557 | 0.109421907 |
| 558 | 0.115342007 |
| 559 | 0.121850101 |
| 560 | 0.128842183 |
| 561 | 0.136432556 |
| 562 | 0.144618132 |
| 563 | 0.153289756 |
| 564 | 0.162844915 |
| 565 | 0.172514377 |
| 566 | 0.18313225 |
| 567 | 0.193594629 |
| 568 | 0.204994091 |
| 569 | 0.216249387 |
| 570 | 0.228512819 |
| 571 | 0.240241805 |
| 572 | 0.25253716 |
| 573 | 0.264133307 |
| 574 | 0.275821102 |
| 575 | 0.287219535 |
| 576 | 0.298712705 |
| 577 | 0.309184352 |
| 578 | 0.319399588 |
| 579 | 0.328667444 |
| 580 | 0.3370703 |
| 581 | 0.344207578 |
| 582 | 0.350303767 |
| 583 | 0.354978886 |
| 584 | 0.358552159 |
| 585 | 0.359890849 |
| 586 | 0.360209045 |
| 587 | 0.358386367 |
| 588 | 0.355236326 |
| 589 | 0.350581803 |
| 590 | 0.345050953 |
| 591 | 0.338203037 |
| 592 | 0.330666211 |
| 593 | 0.322880183 |
| 594 | 0.315260976 |
| 595 | 0.307969233 |
| 596 | 0.301574413 |
| 597 | 0.296158896 |
| 598 | 0.292213879 |

TABLE 6-continued

Relative Absorption of Alexa Fluor ® 635 vs. Excitation Wavelength

| Excitation Wavelength (nm) | AF 635 Relative Absorption |
|---|---|
| 599 | 0.289752749 |
| 600 | 0.289135921 |
| 601 | 0.289979296 |
| 602 | 0.292976933 |
| 603 | 0.297548045 |
| 604 | 0.304026276 |
| 605 | 0.312582566 |
| 606 | 0.323190141 |
| 607 | 0.336041568 |
| 608 | 0.350643589 |
| 609 | 0.367674818 |
| 610 | 0.386478267 |
| 611 | 0.407578084 |
| 612 | 0.430449092 |
| 613 | 0.455286945 |
| 614 | 0.48257666 |
| 615 | 0.510771536 |
| 616 | 0.541385322 |
| 617 | 0.573123608 |
| 618 | 0.607094417 |
| 619 | 0.641138339 |
| 620 | 0.677139839 |
| 621 | 0.7121816 |
| 622 | 0.7481831 |
| 623 | 0.78335873 |
| 624 | 0.818423146 |
| 625 | 0.852023241 |
| 626 | 0.883297105 |
| 627 | 0.911862695 |
| 628 | 0.937339 |
| 629 | 0.959623043 |
| 630 | 0.977274189 |
| 631 | 0.989372859 |
| 632 | 0.998094941 |
| 633 | 1 |
| 634 | 0.996438054 |
| 635 | 0.98686127 |
| 636 | 0.97186794 |
| 637 | 0.951200622 |
| 638 | 0.924982889 |
| 639 | 0.893842894 |
| 640 | 0.858419091 |
| 641 | 0.820461045 |
| 642 | 0.778570338 |
| 643 | 0.734971257 |
| 644 | 0.6888472 |
| 645 | 0.643063994 |
| 646 | 0.595664062 |
| 647 | 0.549468951 |
| 648 | 0.504469394 |
| 649 | 0.461135991 |
| 650 | 0.419945523 |
| 651 | 0.379960905 |
| 652 | 0.343331251 |
| 653 | 0.308186513 |
| 654 | 0.276006459 |
| 655 | 0.245730435 |
| 656 | 0.218813494 |
| 657 | 0.193428838 |
| 658 | 0.171083008 |
| 659 | 0.150746244 |
| 660 | 0.132704819 |
| 661 | 0.116547858 |
| 662 | 0.102007622 |
| 663 | 0.089783321 |
| 664 | 0.078539353 |
| 665 | 0.068292194 |
| 666 | 0.059540249 |
| 667 | 0.052105369 |
| 668 | 0.04514418 |
| 669 | 0.039252913 |
| 670 | 0.034093807 |
| 671 | 0.029614344 |
| 672 | 0.025949422 |
| 673 | 0.02249869 |
| 674 | 0.019667875 |
| 675 | 0.017217042 |
| 676 | 0.015260495 |
| 677 | 0.01325246 |
| 678 | 0.011459645 |
| 679 | 0.01014155 |
| 680 | 0.009071627 |
| 681 | 0.007897699 |
| 682 | 0.006847342 |
| 683 | 0.005826848 |
| 684 | 0.005076152 |
| 685 | 0.004405777 |
| 686 | 0.003849705 |
| 687 | 0.00357167 |
| 688 | 0.002840539 |
| 689 | 0.002572801 |
| 690 | 0.002161926 |
| 691 | 0.001851968 |
| 692 | 0.001502879 |
| 693 | 0.001399902 |
| 694 | 0.00119292 |
| 695 | 0.000894289 |
| 696 | 0.000606986 |
| 697 | 0.00050298 |
| 698 | 0.000420599 |
| 699 | 0.000400004 |
| 700 | 6.01824E−05 |
| 701 | 0 |

TABLE 7

Relative Emission of Alexa Fluor ® 635 vs. Excitation Wavelength

| Excitation Wavelength (nm) | AF 635 Relative Emission |
|---|---|
| 604 | 0 |
| 605 | 0.027431 |
| 606 | 0.017998 |
| 607 | 0.019215 |
| 608 | 0.02091 |
| 609 | 0.023258 |
| 610 | 0.027127 |
| 611 | 0.032561 |
| 612 | 0.038647 |
| 613 | 0.043516 |
| 614 | 0.050559 |
| 615 | 0.058949 |
| 616 | 0.067991 |
| 617 | 0.080033 |
| 618 | 0.09151 |
| 619 | 0.1029 |
| 620 | 0.123549 |
| 621 | 0.139112 |
| 622 | 0.158848 |
| 623 | 0.179716 |
| 624 | 0.210278 |
| 625 | 0.2371 |
| 626 | 0.267661 |
| 627 | 0.303874 |
| 628 | 0.342476 |
| 629 | 0.377472 |
| 630 | 0.424423 |
| 631 | 0.465983 |
| 632 | 0.504848 |
| 633 | 0.556275 |
| 634 | 0.597575 |
| 635 | 0.653437 |
| 636 | 0.6943 |

TABLE 7-continued

Relative Emission of Alexa Fluor ® 635 vs. Excitation Wavelength

| Excitation Wavelength (nm) | AF 635 Relative Emission |
|---|---|
| 637 | 0.741251 |
| 638 | 0.785245 |
| 639 | 0.836238 |
| 640 | 0.865495 |
| 641 | 0.901883 |
| 642 | 0.932834 |
| 643 | 0.954136 |
| 644 | 0.979742 |
| 645 | 0.989957 |
| 646 | 0.999566 |
| 647 | 0.999695 |
| 648 | 1 |
| 649 | 0.996131 |
| 650 | 0.978916 |
| 651 | 0.970612 |
| 652 | 0.950181 |
| 653 | 0.925314 |
| 654 | 0.897187 |
| 655 | 0.8698 |
| 656 | 0.834891 |
| 657 | 0.802113 |
| 658 | 0.766769 |
| 659 | 0.734991 |
| 660 | 0.704212 |
| 661 | 0.676042 |
| 662 | 0.635264 |
| 663 | 0.602313 |
| 664 | 0.5681 |
| 665 | 0.541495 |
| 666 | 0.51002 |
| 667 | 0.480893 |
| 668 | 0.454419 |
| 669 | 0.428379 |
| 670 | 0.402556 |
| 671 | 0.378646 |
| 672 | 0.357867 |
| 673 | 0.34013 |
| 674 | 0.318828 |
| 675 | 0.302047 |
| 676 | 0.285789 |
| 677 | 0.26753 |
| 678 | 0.251533 |
| 679 | 0.242272 |
| 680 | 0.22684 |
| 681 | 0.218666 |
| 682 | 0.208494 |
| 683 | 0.195713 |
| 684 | 0.187975 |
| 685 | 0.181454 |
| 686 | 0.172065 |
| 687 | 0.163109 |
| 688 | 0.157284 |
| 689 | 0.150806 |
| 690 | 0.143981 |
| 691 | 0.139417 |
| 692 | 0.134678 |
| 693 | 0.131461 |
| 694 | 0.127027 |
| 695 | 0.123636 |
| 696 | 0.121288 |
| 697 | 0.119202 |
| 698 | 0.117637 |
| 699 | 0.114681 |
| 700 | 0.114072 |
| 701 | 0.110768 |
| 702 | 0.107812 |
| 703 | 0.107551 |
| 704 | 0.106508 |
| 705 | 0.105378 |
| 706 | 0.103986 |
| 707 | 0.101465 |
| 708 | 0.099683 |
| 709 | 0.099074 |
| 710 | 0.098596 |
| 711 | 0.097987 |
| 712 | 0.09577 |
| 713 | 0.094422 |
| 714 | 0.094118 |
| 715 | 0.090597 |
| 716 | 0.087076 |
| 717 | 0.083772 |
| 718 | 0.085076 |
| 719 | 0.082381 |
| 720 | 0.081294 |
| 721 | 0.078207 |
| 722 | 0.075294 |
| 723 | 0.074208 |
| 724 | 0.070556 |
| 725 | 0.069165 |
| 726 | 0.067513 |
| 727 | 0.063253 |
| 728 | 0.058731 |
| 729 | 0.058949 |
| 730 | 0.056384 |
| 731 | 0.055297 |
| 732 | 0.052341 |
| 733 | 0.049385 |
| 734 | 0.046211 |
| 735 | 0.045081 |
| 736 | 0.044864 |
| 737 | 0.040082 |
| 738 | 0.039864 |
| 739 | 0.037778 |
| 740 | 0.03643 |
| 741 | 0.034778 |
| 742 | 0.032952 |
| 743 | 0.029996 |
| 744 | 0.029474 |
| 745 | 0.028605 |
| 746 | 0.025736 |
| 747 | 0.025301 |
| 748 | 0.023649 |
| 749 | 0.023867 |
| 750 | 0.021475 |
| 751 | 0.022388 |
| 752 | 0.019389 |
| 753 | 0.019389 |
| 754 | 0.018215 |
| 755 | 0.016302 |
| 756 | 0.016694 |
| 757 | 0.016346 |
| 758 | 0.015694 |
| 759 | 0.015215 |
| 760 | 0.014737 |
| 761 | 0.012911 |
| 762 | 0.012129 |
| 763 | 0.012042 |
| 764 | 0.012737 |
| 765 | 0.011172 |
| 766 | 0.010999 |
| 767 | 0.009868 |
| 768 | 0.009912 |
| 769 | 0.010607 |
| 770 | 0.010477 |
| 771 | 0.008695 |
| 772 | 0.008868 |
| 773 | 0.008868 |
| 774 | 0.008129 |
| 775 | 0.008955 |
| 776 | 0 |

I claim:

1. A method of normalizing a first diagnostic result of a subordinate clinical diagnostic analyzer to a second diagnostic result of a master clinical diagnostic analyzer, said method comprising the steps of:

(i) obtaining a normalized excitation intensity spectrum of the master clinical diagnostic analyzer,
(ii) obtaining a normalized excitation intensity spectrum of the subordinate clinical diagnostic analyzer,
(iii) obtaining a normalized responsivity intensity spectrum of the master clinical diagnostic analyzer,
(iv) obtaining a normalized responsivity intensity spectrum of the subordinate clinical diagnostic analyzer,
(v) obtaining a normalized excitation/emission spectrum of a solid inorganic photostable fluorophore calibration target,
determining a ratio of spectral differences between the master clinical diagnostic analyzer and the subordinate clinical diagnostic analyzer using at least (i) to (v),
reading the solid inorganic photostable fluorophore calibration target in the master clinical diagnostic analyzer thereby obtaining a first response value ($E_A$),
reading the solid inorganic photostable fluorophore calibration target in the subordinate clinical diagnostic analyzer thereby obtaining a second response value ($E_B$),
determining a gain ratio ($G_R$) of the master clinical diagnostic analyzer to the subordinate clinical diagnostic analyzer based upon (a) a ratio of the first response value and the second response value ($E_A/E_B$), and (b) the ratio of spectral differences,
using the determined gain ratio ($G_R$) to determine a multiplicative normalization factor between a normalized subordinate clinical diagnostic analyzer and the master clinical diagnostic analyzer,
determining a relative absorption/emission spectrum of a first fluorescently labeled dye whereas the first fluorescently labeled dye is a diagnostic assay component,
obtaining a first diagnostic result from a specific patient specimen or sample incorporating the first fluorescently labeled dye using the normalized subordinate clinical diagnostic analyzer, and
modifying the first diagnostic result by the multiplicative normalization factor to obtain a second diagnostic result, wherein the second diagnostic result is a normalized approximation to a diagnostic result which would be obtained by analyzing the specific patient specimen or sample on the master clinical diagnostic analyzer, and wherein the gain ratio ($G_R$) is not dependent upon the first fluorescently labeled dye to enable subsequent re-normalization using only absorption/emissivity spectra of a second or subsequent fluorescently labeled dyes substituted for the first fluorescently labeled dye, and
wherein the multiplicative normalization factor is based on the relative absorption/emission spectrum of the first fluorescently labeled dye.

2. A method as claimed in claim 1, wherein the solid inorganic photostable fluorophore is a phosphate matrix glass.

3. A method as claimed in claim 2, wherein the phosphate matrix glass is a bismuth-doped phosphate glass.

4. A method as claimed in claim 2, wherein the phosphate matrix glass is a copper-doped phosphate glass.

5. A method as claimed in claim 1, wherein the modification of the first diagnostic result by the multiplicative normalization factor to obtain the second diagnostic result is accomplished by using a linear calibration curve.

6. A method as claimed in claim 1, in which the gain ratio is determined by the relation:

$$G_R = \left(\frac{G_A \cdot \varphi_A}{G_B \cdot \varphi_B}\right) = \left(\frac{E_A}{E_B}\right) \cdot \left\{ \frac{\sum_\chi S_{RB}(\chi) \cdot \left[\sum_\xi S_B(\xi) \cdot ECglass(\xi, \chi)\right]}{\sum_\chi S_{RA}(\chi) \cdot \left[\sum_\xi S_A(\xi) \cdot ECglass(\xi, \chi)\right]} \right\}$$

wherein $S_{RA}(\chi)$ corresponds to (i), $S_{RB}(\chi)$ corresponds to (ii), $S_A(\xi)$ corresponds to (iii), $S_B(\xi)$ corresponds to (iv), and $ECglass(\xi, \chi)$ corresponds to (v).

7. A method to re-normalize a subordinate clinical diagnostic analyzer assay result as compared to a master clinical diagnostic analyzer assay result comprising the steps of:
normalizing the subordinate clinical diagnostic analyzer as claimed in claim 1,
determining a relative absorption/intensity spectrum of a second fluorescently labeled dye whereas the second fluorescently labeled dye is a diagnostic assay component,
determining a re-normalization multiplicative factor between a subordinate clinical diagnostic analyzer and a master clinical diagnostic analyzer,
obtaining a first diagnostic result from a specific patient specimen or sample incorporating the second fluorescently labeled dye using the normalized subordinate clinical diagnostic analyzer, and
modifying the first diagnostic result by the re-normalization factor to obtain a second diagnostic result wherein the second diagnostic result is a normalized approximation to a diagnostic result which would be obtained by analyzing the specific patient specimen or sample on the master clinical diagnostic analyzer.

8. A method as claimed in claim 7, wherein the modification of the first diagnostic result by the multiplicative re-normalization factor to obtain the second diagnostic result is accomplished by using a linear calibration curve.

9. A method of normalizing a first diagnostic result of a subordinate clinical diagnostic analyzer to a second diagnostic result of a master clinical diagnostic analyzer, said method comprising the steps of:
determining a ratio of spectral differences between the master clinical diagnostic analyzer and the subordinate clinical diagnostic analyzer using at least (i) a normalized excitation intensity spectrum of the master clinical diagnostic analyzer, (ii) a normalized excitation intensity spectrum of the subordinate clinical diagnostic analyzer, (iii) a normalized responsivity intensity spectrum of the master clinical diagnostic analyzer, (iv) a normalized responsivity intensity spectrum of the subordinate clinical diagnostic analyzer, and (v) a normalized excitation/emission spectrum of solid inorganic photostable fluorophore calibration target;
obtaining a first response value ($E_A$) as the solid inorganic photostable fluorophore calibration target in the master clinical diagnostic analyzer;
obtaining a second response value ($E_B$) as the solid inorganic photostable fluorophore calibration target in the subordinate clinical diagnostic analyzer;
determining a gain ratio ($G_R$) of the master clinical diagnostic analyzer to the subordinate clinical diagnostic analyzer based upon (a) a ratio of the first response value and the second response value ($E_A/E_B$), and (b) the ratio of spectral differences;
using the determined gain ratio ($G_R$) to determine a multiplicative normalization factor between a normalized subordinate clinical diagnostic analyzer and the master clinical diagnostic analyzer;

determining a relative absorption/emission spectrum of a first fluorescently labeled dye whereas the first fluorescently labeled dye is a diagnostic assay component;

obtaining a first diagnostic result from a specific patient specimen or sample incorporating the first fluorescently labeled dye using the normalized subordinate clinical diagnostic analyzer; and modifying the first diagnostic result by the multiplicative normalization factor to obtain a second diagnostic result, wherein the second diagnostic result is a normalized approximation to a diagnostic result which would be obtained by analyzing the specific patient specimen or sample on the master clinical diagnostic analyzer, and wherein the multiplicative normalization factor is based on the relative absorption/emission spectrum of the first fluorescently labeled dye.

10. A method as claimed in claim 9, in which the gain ratio is determined by the relation:

$$G_R = \left(\frac{G_A \cdot \varphi_A}{G_B \cdot \varphi_B}\right) = \left(\frac{E_A}{E_B}\right) \cdot \left\{\frac{\Sigma_\chi S_{RB}(\chi) \cdot [\Sigma_\xi S_B(\xi) \cdot EC\text{glass}(\xi, \chi)]}{\Sigma_\chi S_{RA}(\chi) \cdot [\Sigma_\xi S_A(\xi) \cdot EC\text{glass}(\xi, \chi)]}\right\}$$

wherein $S_{RA}(\chi)$ corresponds to (i), $S_{RB}(\chi)$ corresponds to (ii), $S_A(\xi)$ corresponds to (iii), $S_B(\xi)$ corresponds to (iv), and $EC\text{glass}(\xi, \chi)$ corresponds to (v).

11. A method as claimed in claim 9, wherein the solid inorganic photostable fluorophore is a phosphate matrix glass.

12. A method as claimed in claim 11, wherein the phosphate matrix glass is a bismuth-doped phosphate glass, or a copper-doped phosphate glass.

13. A method as claimed in claim 9, wherein the modification of the first diagnostic result by the multiplicative normalization factor to obtain the second diagnostic result is accomplished by using a linear calibration curve.

14. A method as claimed in claim 9, wherein a plurality of subordinate clinical diagnostic analyzers are associated with the master clinical diagnostic analyzer, and the method of claim 9 is carried out for the plurality of subordinate clinical diagnostic analyzers.

15. A method to re-normalize a subordinate clinical diagnostic analyzer assay result as compared to a master clinical diagnostic analyzer assay result comprising the steps of:

normalizing the subordinate clinical diagnostic analyzer as claimed in claim 9, determining a relative absorption/intensity spectrum of a second fluorescently labeled dye whereas the second fluorescently labeled dye is a diagnostic assay component, determining a re-normalization multiplicative factor between a subordinate clinical diagnostic analyzer and a master clinical diagnostic analyzer, obtaining a first diagnostic result from a specific patient specimen or sample incorporating the second fluorescently labeled dye using the normalized subordinate clinical diagnostic analyzer, and modifying the first diagnostic result by the re-normalization factor to obtain a second diagnostic result wherein the second diagnostic result is a normalized approximation to a diagnostic result which would be obtained by analyzing the specific patient specimen or sample on the master clinical diagnostic analyzer.

* * * * *